United States Patent [19]
Jin et al.

[11] Patent Number: 6,124,046
[45] Date of Patent: Sep. 26, 2000

[54] ORGANIC ELECTROLUMINESCENT POLYMER FOR LIGHT EMITTING DIODE

[75] Inventors: Sung-Ho Jin; Woo-Hong Kim; Byung-Hee Son; In-Sung Song; Eun-Mi Han, all of Taejeon, Rep. of Korea

[73] Assignees: Samsung Display Device Co., Ltd; Cheil Industries Inc., both of Rep. of Korea

[21] Appl. No.: 09/133,181

[22] Filed: Aug. 12, 1998

[30] Foreign Application Priority Data

Aug. 12, 1997 [KR] Rep. of Korea ............ 97-38392
Dec. 29, 1997 [KR] Rep. of Korea ............ 97-77055

[51] Int. Cl.$^7$ ..................................... B32B 9/00
[52] U.S. Cl. ............... 428/690; 428/917; 252/301.17; 252/301.35; 313/504; 313/506; 525/204; 526/260
[58] Field of Search ............. 526/260; 525/204; 252/301.17, 301.35; 428/690, 917; 313/504, 506

[56] References Cited

U.S. PATENT DOCUMENTS 5,247,190 9/1993 Friend et al. ................ 257/40
5,473,047 12/1995 Shi ......................... 528/310

*Primary Examiner*—William Krynski
*Assistant Examiner*—Chris Cronin
*Attorney, Agent, or Firm*—Woodcock Washburn Kurtz Mackiewicz & Norris

[57] ABSTRACT

An organic electroluminescent (EL) polymer for a light emitting diode in accordance with the present invention is PDPCVz which is prepared by combining a dialkyl substituted phenylene moiety and a carbazole moiety. Another organic EL polymer is PPOPPD which is prepared by combining an oxadiazole moiety and a phenylene moiety. In the present invention, a polymer blend of said PDPCVz and PPDPPO is used for an organic EL polymer. The organic EL polymer according to the present invention is applied to a light emitting layer of a light emitting diode having a cathode/light emitting layer/anode structure, a cathode/buffer layer/light emitting layer/anode structure, or a cathode/hole transporting layer/light emitting layer/electron transporting layer/anode structure. Each of said PDPCVz and PPDPPO can be blended with conventional polymers such as polystyrene, polycarbonate, polyacrylate, polymethylmethacrylate, polyvinylcarbazole, polyimide, liquid crystalline polymer, etc. The EL polymers according to the present invention can be blended with a lower molecular fluorescent dye.

12 Claims, 21 Drawing Sheets

MULTILAYER

A. SINGLE LAYER

B. MULTILAYER

ORGANIC ELECTROLUMINESCENT POLYMER FOR LIGHT EMITTING DIODE

FIELD OF THE INVENTION

The present invention relates to an electroluminescent (EL) polymer for use of an electroluminescent (EL) display. More particularly, the present invention relates to poly(2,5-dialkyl phenylene-alt-N-alkyl-3,6-carbazole vinylene) (hereinafter, "PDPCVz") prepared by combining a dialkyl substituted phenylene moiety and a carbazole moiety. In addition, the present invention relates to poly (1,4-phenylene-1',4'-(2',5'-dialkoxy )phenylene-1",4"-phenylene-2,5-oxadiazole) (hereinafter, "PPDPPO") prepared by combining an oxadiazole moiety and a poly(p-phenylene vinylene) moiety. Also, the EL polymer of the present invention may include a blend of PDPCVz and PPDPPO.

BACKGROUND OF THE INVENTION

An optoelectronic device converting optic energy into electric energy vice versa is very important in the electronic information industry nowadays. Such semiconductive optoelectronic devices can be classified into an electroluminescent device, a semiconductive laser device, a light-receiving type device, etc. A flat panel display means generally a device that solves a difficulty of the picture processing by the conventional CRT mode, and a device that has a possibility of expressing at least the same level as that of the CRT mode. The earlier display was mostly used for a hang-on-the-wall television. It has been developing to be applied to a computer monitor, a notebook PC, a PDA terminal, etc. Most of the display means are light-receiving type, whereas an electroluminescent display is magnetic-light-emitting type. The EL display has advantages of a fast responsivity, obviation of a backlight, an excellent luminance as well as a wide viewing angle, so that many applications have been studying in many ways. In case of the EL device prepared from an inorganic material, as the driving voltage is over 220V and the preparation of the EL device is carried out by means of a vacuum deposition, a large size device cannot be prepared and the cost of preparation is very high. However, Eastmann Kodak Company presented a device prepared with a pigment having $\pi$-conjugated structure, called "tris(8-hydroxyquinoline) aluminum: $Alq_3$," in 1987 and thereafter the researches of EL devices using organic material have actively studied. In case of using an organic material, a mechanism of synthesis is simple, it is easy to synthesize materials in the various forms, and color tuning is available, whereas it has disadvantages of low mechanical strength and crystallization caused by heat. To overcome the above disadvantages, an organic EL device having a polymer structure has been researching. In the $\pi$-conjugated polymer, a conduction band and a valence band in the energy level are separated by the overlap of $\pi$-electron wave function which exists in polymer main chain, a semiconductive property of polymer is decided by a band gap energy which is the energy difference, and a processing of full color is possible. Poly (ethylene terephthalate) had been reported to show electroluminescence in a high electric field. Then, the luminescent device made from poly(p-phenylene vinylene) (hereinafter, "PPV") had been presented, and thereafter it has been studied to apply $\pi$-conjugated polymer to an electroluminescent display. The representative organic EL polymer is poly(p-phenylene vinylene)(PPV), which is $\pi$-conjugated polymer derivative. Poly(p-phenylene vinylene) derivative used for polymer electroluminescent devices has a drawback of mass production due to poor solubility in an organic solvent, long polymerization time and low polymerization yield.

In general, an organic EL material of PPV has disadvantages as follows:

1) polysulfonium precursor, which is a precursor of PPV, has disadvantages of long polymerization time, low polymerization yield and high cost of preparation;
2) it is difficult to perfectly remove the sulfonium salt;
3) in case of forming a thin film (600 Å), a pin-hole is formed by removing unreacted sulfonium salt, thereby the homogeneity of the film being bad; and
4) it is difficult to synthesize a soluble PPV because of hard conditions of synthesis and polymerization.

The EL devices are classified into a single layer device and a multilayer device. The single layer device has a simple structure having only one polymer layer, and is prepared by a simple process with a low cost. In order to obtain a high efficiency in a single layer device, it is necessary to optimize the transporting balance of carriers such as holes or electrons. In a multilayer device, a hole transporting layer and an electron transporting layer are layer-built. In a single layer device, the EL polymer layer should be able to carry both of holes and electrons. To fabricate a polymer layer of the most ideal single layer device, there is a method of forming a polymer layer which is prepared from a single polymer carrying both holes and electrons. In other ways, there is a method of forming a polymer layer which is prepared by blending two polymers having both of characteristics above, or a polymer layer prepared from a moleculary dispersed polymer in which a specific molecular is dispersed. In other words, a polymer blend of a hole transporting polymer and an electron transporting polymer may be used, and a moleculary dispersed polymer in which carrier transporting molecules are dispersed may be used.

The next generation single layer type device is a device that utilizes a luminescent polymer in which a lower molecular compound having a property of electron transporting and a lower molecular compound having a property of hole transporting are dispersed in the polymer matrix. It is preferred that the polymer matrix is an inert polymer electrically or optically, or a polymer having a property of transporting carriers. But, in case of dispersing lower molecular compounds in the polymer matrix, the lower molecular compounds aggregate upon increasing the temperature, and the device can be deteriorated.

The organic EL polymers of the present invention relates to polymers that can solve the shortcomings of the conventional poly(p-phenylene vinylene) (PPV).

OBJECTS OF THE INVENTION

An object of the present invention is to provide an organic electroluminescent (EL) polymer to improve optoelectronic property of an EL device.

Another object of the invention is to provide an organic EL polymer having an excellent optical penetrativity.

A further object of the invention is to provide an organic EL polymer being resistant to atmospheric condition.

A further object of the invention is to provide an organic EL polymer having an excellent adhesion to a substrate.

A further object of the invention is to provide an organic EL polymer which can apply to easily form a thin film.

A further object of the invention is to provide an organic EL polymer which can improve the productivity by simplifying conditions of the polymerization process in comparison to a conventional PPV derivative.

A further object of the invention is to provide an organic EL polymer having a lower driving voltage than a conventional greenish luminescence polymer, and being capable of driving a uniform green.

Other objects and advantages of this invention will be apparent from the ensuing disclosure and appended claims.

SUMMARY OF THE INVENTION

An organic electroluminescent (EL) polymer for a light emitting diode in accordance with the present invention is PDPCVz which is prepared by combining a dialkyl substituted phenylene moiety and a carbazole moiety.

Another organic electroluminescent (EL) polymer in accordance with the present invention is PPDPPO which is prepared by combining an oxadiazole moiety and a poly(p-phenylene vinylene) moiety. Also, a polymer blend of PDPCVz and PPDPPO can be used for an organic electroluminescent polymer.

The organic EL polymer according to the present invention is applied to a light emitting layer of a light emitting diode having a cathode/light emitting layer/anode structure, a cathode/buffer layer/light emitting layer/anode structure, or a cathode/hole transporting layer/light emitting layer/anode structure. The buffer layer is a conductive polymer such as polythiophene, polyaniline, polyacetylene, polypyrrole or PPV derivative.

Each of the PDPCVz and the PPDPPO can be blended with conventional polymers such as polystyrene, polycarbonate, polyacrylate, polymethylmetacrylate, polyvinylcarbazole, polyimide, liquid crystalline polymer, etc.

Each of the PDPCVz and the PPDPPO can be blended with a small amount of a lower molecular fluorescent dye.

BRIEF DESCRIPTION OF THE DRAWINGS

The present invention will be described with reference to the accompanying drawings of which.

DETAILED DESCRIPTION OF THE INVENTION

In case of using MEH-PPV as a luminescent polymer, which is the representative PPV derivative, the solubility of MEH-PPV is excellent because alkoxide is substituted. But, as the electron density is high, the polymer absorbs ultraviolet (UV) in long wavelengths. Accordingly, the object of the present invention is to synthesize a stable light emitting polymer which has no reactivity on the interface with electrode, and which has a PPV structure that is the most stable, and which performs a greenish light by absorbing UV in short wavelength by controlling the substituent. Accordingly, in order to reduce the reactivity on the interface with the electrode and to have the PPV structure, a carbazole moiety is introduced into a dialkyl substituted phenylene moiety. The introduction of a carbazole moiety into a dialkyl substituted phenylene moiety can control the electric charge migration, and increase the solubility without introducing oxygen atom. The Wittig polymerization method is adopted for polymerization of the novel greenish monomers having dialkyl substituents, so a light emitting polymer, which is soluble and has an excellent electro-optic characteristic, can be obtained.

A light emitting polymer for use of electroluminescent displays in accordance with the present invention is poly(2,5-dialkylphenylene-alt-N-alkyl-3,6-carbazole vinylene) of the following formula (I), prepared by combining dialkyl substituted phenylene moiety and carbazole moiety:

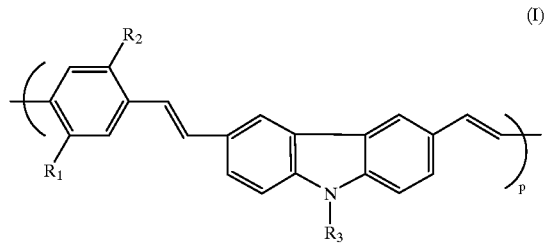

(I)

wherein $R_1$, $R_2$ and $R_3$ are the same one another or different, and long chain aliphatic alkyl or branched aliphatic alkyl group, said long chain aliphatic alkyl group being represented as —(CH$_2$)$_n$CH$_3$ (n=1~12) and said branched aliphatic alkyl group being represented as —CH$_2$CHCH$_3$(CH$_2$)$_n$CH$_3$ (n=1~12), p is an integer of 5~100. In the preferred embodiment of the present invention, $R_1$ and $R_2$ are a hexyl, a methylhexyl or an ethylhexyl group, and $R_3$ is an ethyl group.

Figure 1:
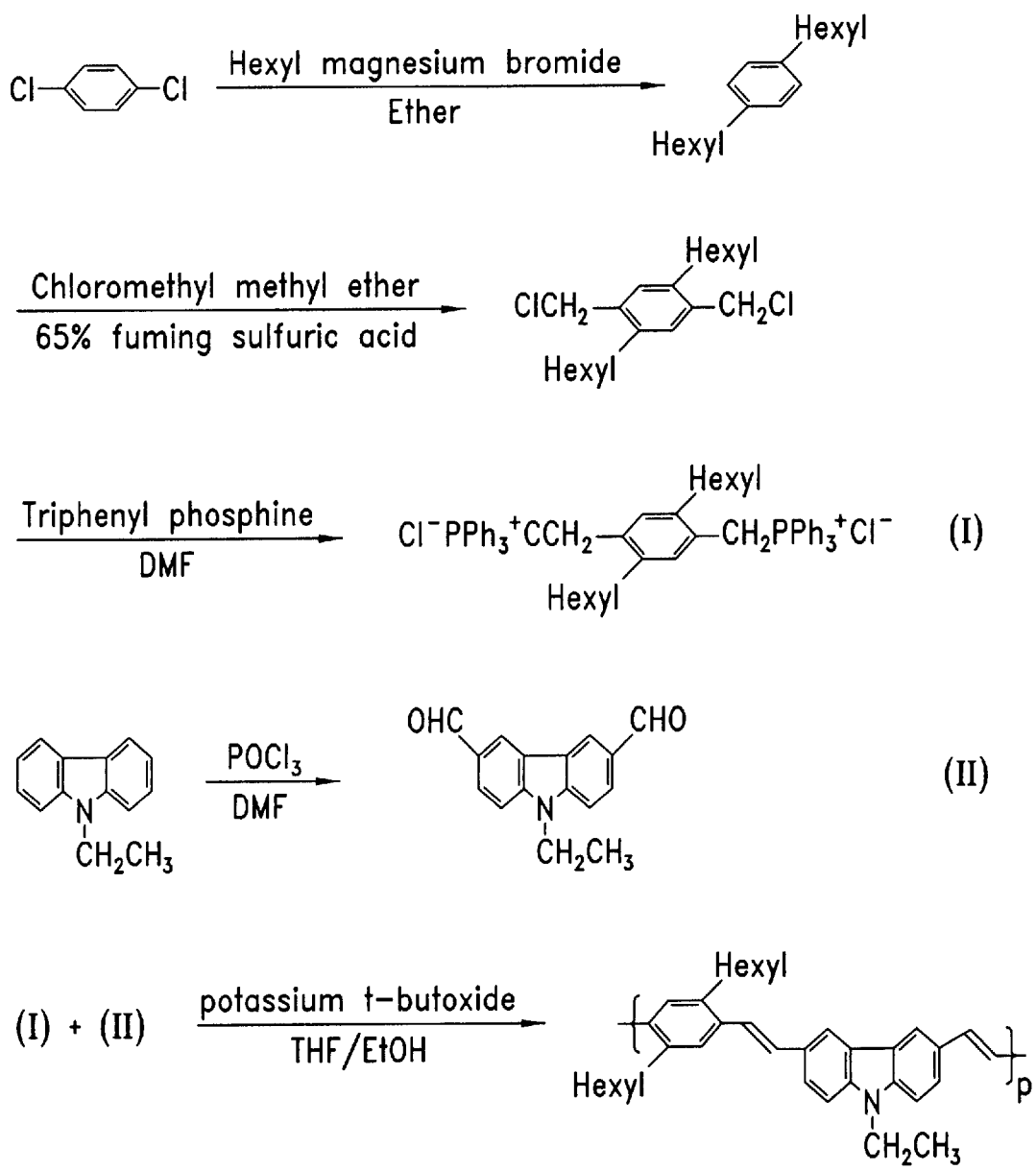
FIG. 1 is a reaction process of preparing PDPCVz according to the present invention.
Figure 2:
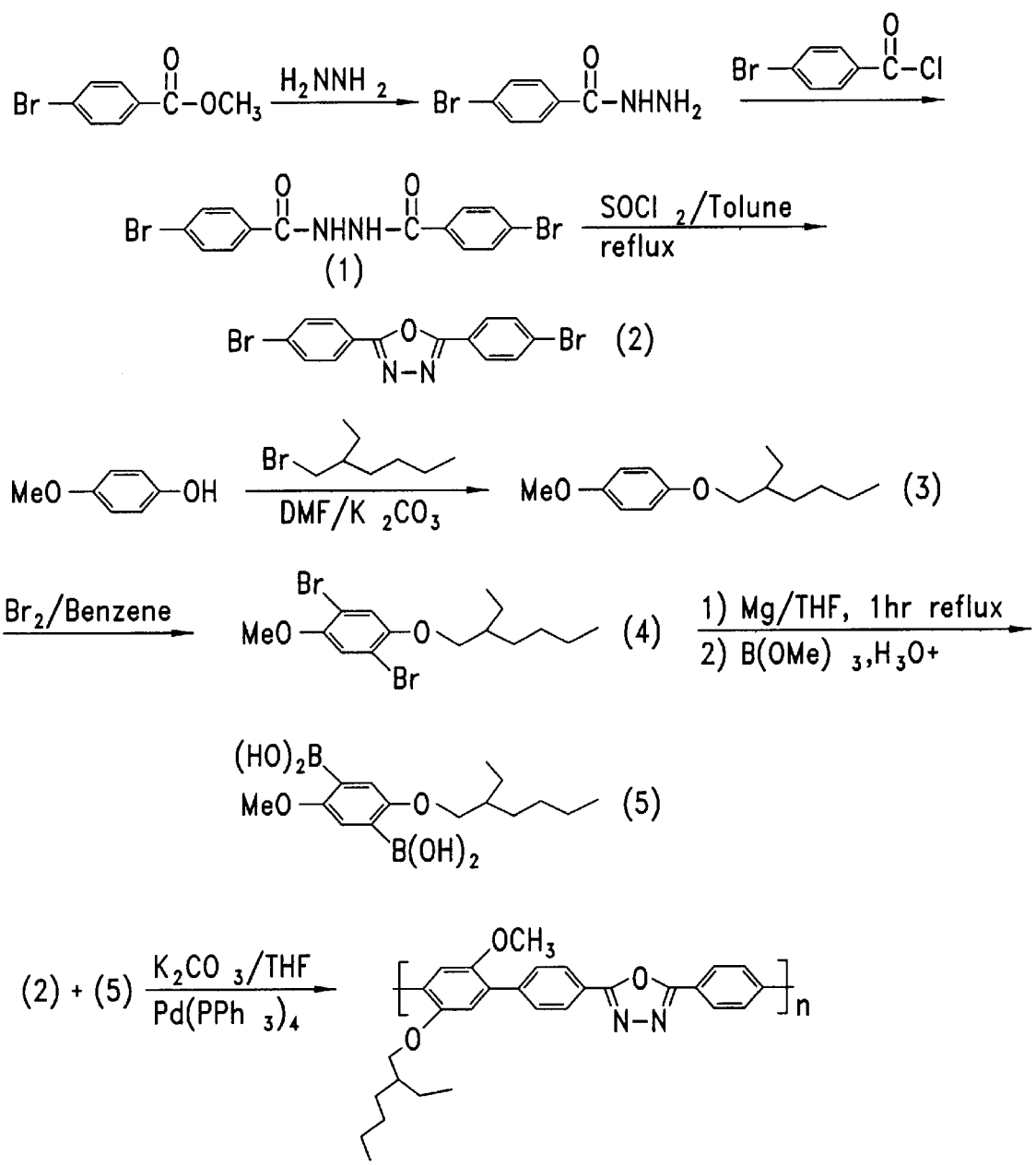
FIG. 2 is a reaction process of preparing PPDPPO according to the present invention.

FIG. 1 illustrates a reaction mechanism to prepare poly (2,5-dihexylphenylene-alt-N-ethyl-3,6-carbazole vinylene) (PDPCVz) from dichlorobenzene in accordance with one example of the present invention.

The light emitting polymer as shown in FIG. 1 has a structure in which hexyl groups are bonded on 2,5 positions of phenylene. Each stage of preparing poly(2,5-dihexyl phenylene-alt-N-ethyl-3,6-carbazole vinylene) from dichlorobenzene in FIG. 1 is described in Examples.

A thin film is formed from a light emitting polymer of the present invention which is soluble in an organic solvent, by dissolving 2.0~0.5% by weight of the light emitting polymer in a solvent such as THF, chloroform or trichloroethylene, and spin-coating on a substrate. The thin film formed by the above method is uniform and free of pin holes and has an excellent adhesion to a substrate.

Another organic electroluminescent polymer in accordance with the present invention is PPDPPO which is prepared by combining an oxadiazole moiety and a poly(p-phenylene vinylene) moiety.

In the light emitting mechanism of an electroluminescent polymer, the light emitting efficiency is decided by the radiative decay according to recombination of holes and electrons. In order to achieve an appropriate transportation of carriers, the migration of the introduced holes and electrons should be small. However, as the transportation of holes is generally much higher than that of electrons, the disproportion of carriers occurs, which is a factor to decrease the efficiency. Especially, the transportation of holes is much higher in π-conjugated polymer. In the present invention, in order to improve the above drawbacks, an electroluminescent polymer is synthesized by combining an electroluminescent polymer with an oxadiazole derivative for forming an electron transporting layer having a good migration of electrons. An electroluminescent polymer containing an oxadiazole moiety in accordance with the present invention is represented as the following formula (II):

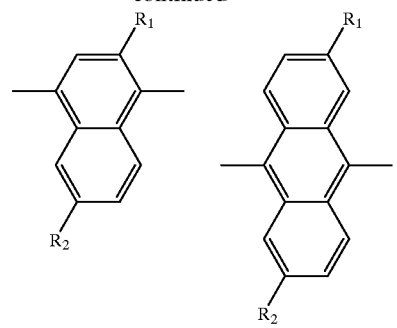

-continued

The EL polymers prepared in accordance with the present invention have properties of electron transporting, electric charge transporting and light emitting, and is capable of fabricating a single layer device having outstandingly improved light emitting efficiency, increased luminance and prolonged life of the device, compared to the device fabricated with a blend of lower molecular EL polymers.

The EL polymers prepared in accordance with the present invention can be dissolved in an organic solvent. A thin film is formed by dissolving 2.0~0.5% by weight of the EL polymer in an organic solvent such as THF, chloroform or trichloroethylene, and spin-coating on a substrate. The thin film formed by the above method is uniform and free of pin holes and has an excellent adhesion to a substrate.

In the present invention, a polymer blend of PDPCVz and PPDPPO may be used for an electroluminescent polymer.

In the polymer blend of PDPCVz and PPDPPO, the PDPCVz functions as a light emitting site regardless of the content ratio of the PPDPPO. However, the luminous efficiency can be reached up to the maximum value at the content ratio of 17%:83% by weight of PDPCVz:PPDPPO.

The organic EL polymers according to the present invention may be applied to a light emitting layer of a light

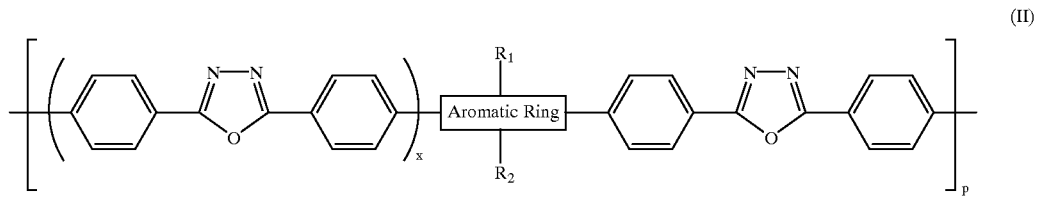

wherein $R_1$ is aliphatic alkyl or aliphatic alkyloxy, $R_2$ is branched alkyl or branched alkyloxy, said aliphatic alkyl being $(CH_2)_n CH_3$ (n=1~12), said aliphatic alkyloxy being $(OCH_2CH_2)_m CH_3$ (m=1~4), said branched alkyl being $CH_2CHCH_3(CH_2)_n CH_3$ (n=1~12), and said branched alkyloxy being $OCH_2CHCH_3(CH_2)_n CH_3$ (n=1~12), x is 0 or 1, p is an integer of 5~100, and Aromatic Ring represents as follow:

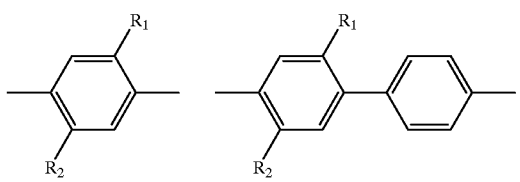

emitting diode having a cathode/light emitting layer/anode structure, a cathode/buffer layer/light emitting layer/anode structure, or a cathode/hole transporting layer/light emitting layer/anode structure. The buffer layer is a conductive polymer such as polythiophene, polyaniline, polyacetylene, polypyrrole or PPV derivative.

A layer-built type device may be prepared by depositing tris(8-hydroxyquinoline) aluminum ($Alq_3$) as an electron transporting material onto the film of the polymer blend of PDPCVz and PPDPPO. The efficiency of light emitting for the layer-built type device is better than that for a single layer type.

Each of the PDPCVz and the PPDPPO can be blended with conventional polymers such as polystyrene, polycarbonate, polyacrylate, polymethylmetacrylate, polyvinylcarbazole, polyimide, liquid crystalline polymer, etc.

Each of the PDPCVz and the PPDPPO can be blended with a small amount of a lower molecular fluorescent dye.

The examples of the lower molecular fluorescent pigment are Nile Red, tris(8-hydroxyquinoline) aluminum (Alq$_3$), 2-(4-tert-butylphenyl)-5-(4-biphenylyl)-1,3,4-(oxadiazole), N,N'-diphenyl-N,N'-di(m-tolyl)-benzidine, 4-(dicyanomethylene)-2-methyl-6-(4-dimethylaminostyryl)-4H-pyran, 3-(4-biphenylyl)-4-phenyl-5-(4-tert-butylphenyl)-1,2,4-triazole, 4,4'-bis(9-carbazolyl)biphenyl and Coumarin 6.

The present invention may be better understood by reference to the following examples which are intended for purposes of illustration and are not to be confined in any way limiting the scope of the present invention, which is defined in the claims appended hereto.

EXAMPLES

Example 1

Preparation of PDPCVz (1) Preparation of 2,5-dihexylbenzene

Figure 3:
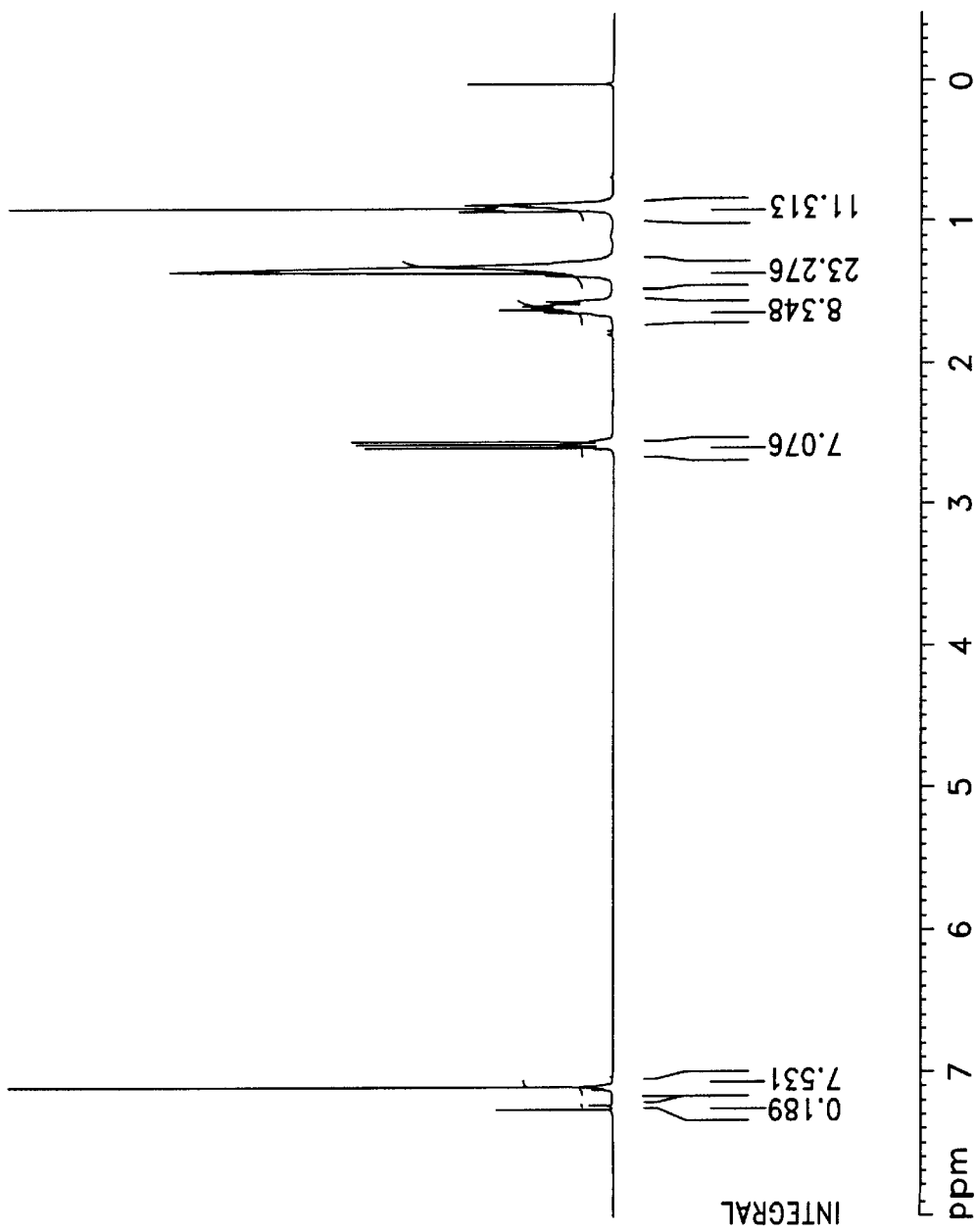
FIG. 3 is a H-NMR spectrum of 2,5-dihexylbenzene.

Nitrogen was introduced into a flask (250 ml), and 10 ml of anhydrous diethyl ether was added, and 15 g of magnesium was added, and stirred. Hexyl bromide (0.61 mole) of 100 g mixed with 50 ml of diethylether was poured into a dropping funnel, and the mixture therein was slowly added into the flask over 1 hour. The reaction was carried out at 45° C. for 3 hours. The reaction product, Grignard, was poured into a dropping funnel. To the reactant was slowly added a mixture of 42 g of 1,4-dichlorobenzene (0.29 mol), 0.3 g of NiCl$_2$ and 80 ml of diethylether, and the reaction was carried out at room temperature for 24 hours to obtain solid reaction product. 6 N HCl was slowly added so as to neutralize the solid reaction product, the product was extracted with diethyl ether and dried with anhydrous MgSO$_4$, and the reaction product was separated by vacuum distillation (122° C./0.1 mmHg). The structure analysis of the compound was confirmed by $^1$H-NMR, which was shown in FIG. 3.

Figure 4:
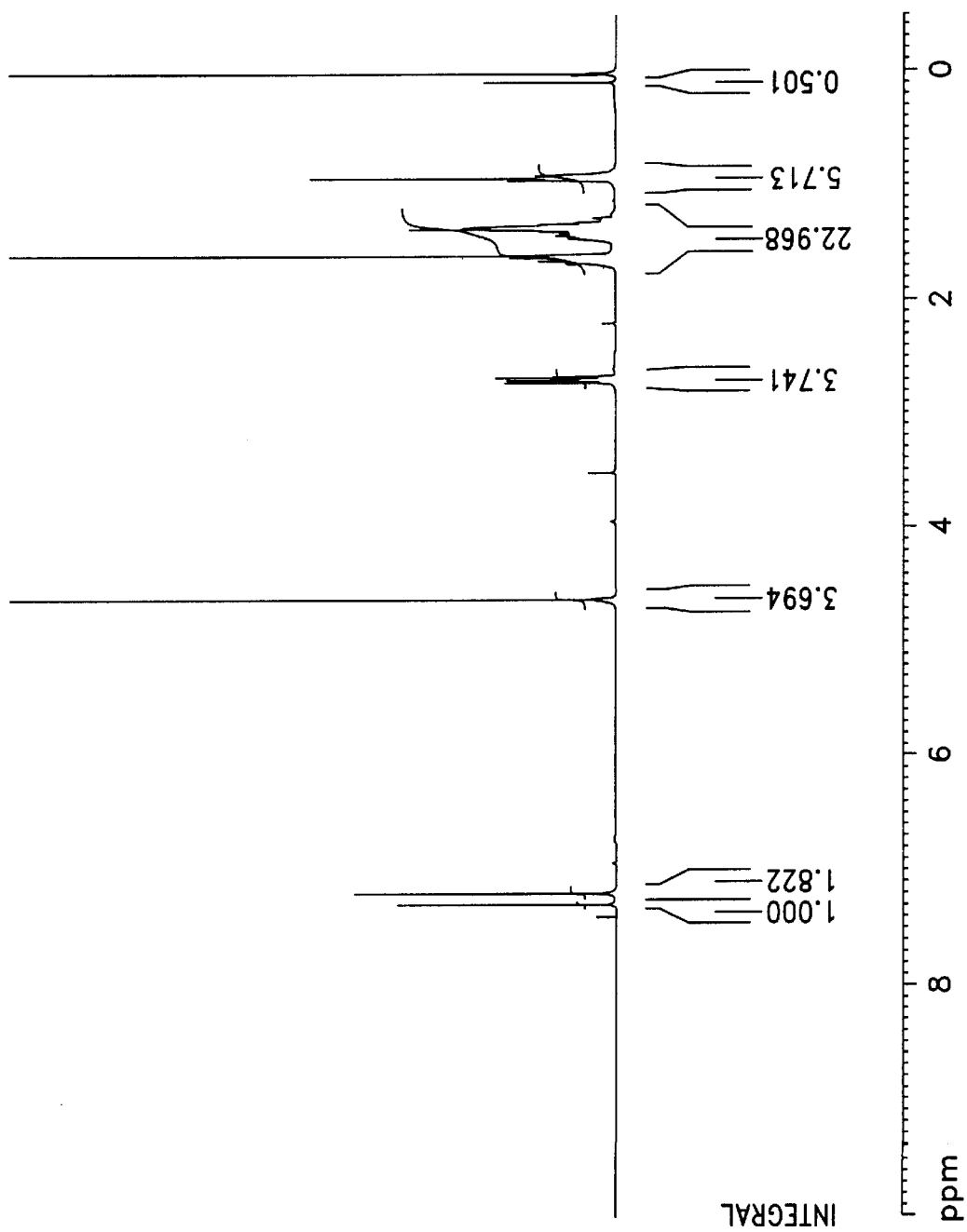
FIG. 4 is a H-NMR spectrum of 2,5-bis(chloromethyl)-1,4-dihexylbenzene.

(2) Preparation of 2,5-bis(chloromethyl)-1,4-dihexylbenzene 20 g (0.081 mol) of 1,4-dihexylbenzene and 18 g (0.226 mol) of chloromethyl methyl ether were cooled down to 10° C. 60% of fuming sulfuric acid (11.2 g) was slowly dropped at 0° C. over 30 minutes. After dropping, the reactant was stirred at room temperature for 22 hours. The resulting mixture was poured into ice water, and a precipitate was produced. After separating it by filtration, the solvent was separated with hexane in a column. The structure analysis was confirmed by $^1$H-NMR, which was shown in FIG. 4.

Figure 5:
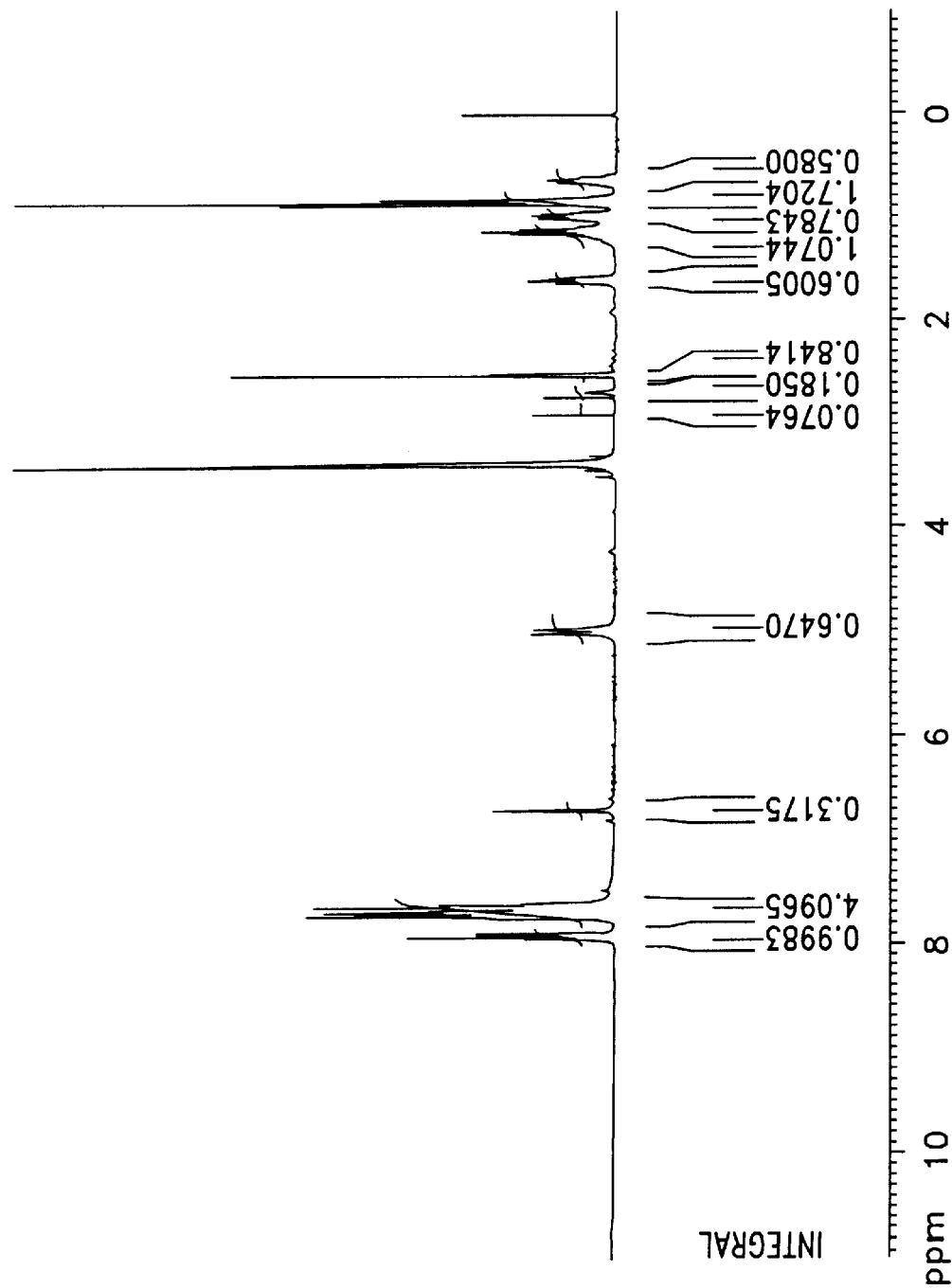
FIG. 5 is a H-NMR spectrum of 1,6-bis(chloromethyl)-2,5-dihexylbenzene triphenylphosphonium salt.

(3) Preparation of 1,6-bis(chloromethyl)-2,5-dihexylbenzene Triphenylphosphonium Salt 5 g of 2,5-bis(chloromethyl)-1,4-dihexylbenzene and 7.66 g of triphenylphosphine were added into 80 ml of DMF, and the reaction was carried out for 12 hours as being refluxed. The resultant was cooled down to room temperature, and 1 l of ether was added thereto and stirred for 1 hour. A white solid was separated and dried. The reaction yield was about 45%. The structure analysis was confirmed by $^1$-NMR, which was shown in FIG. 5.

Figure 6:
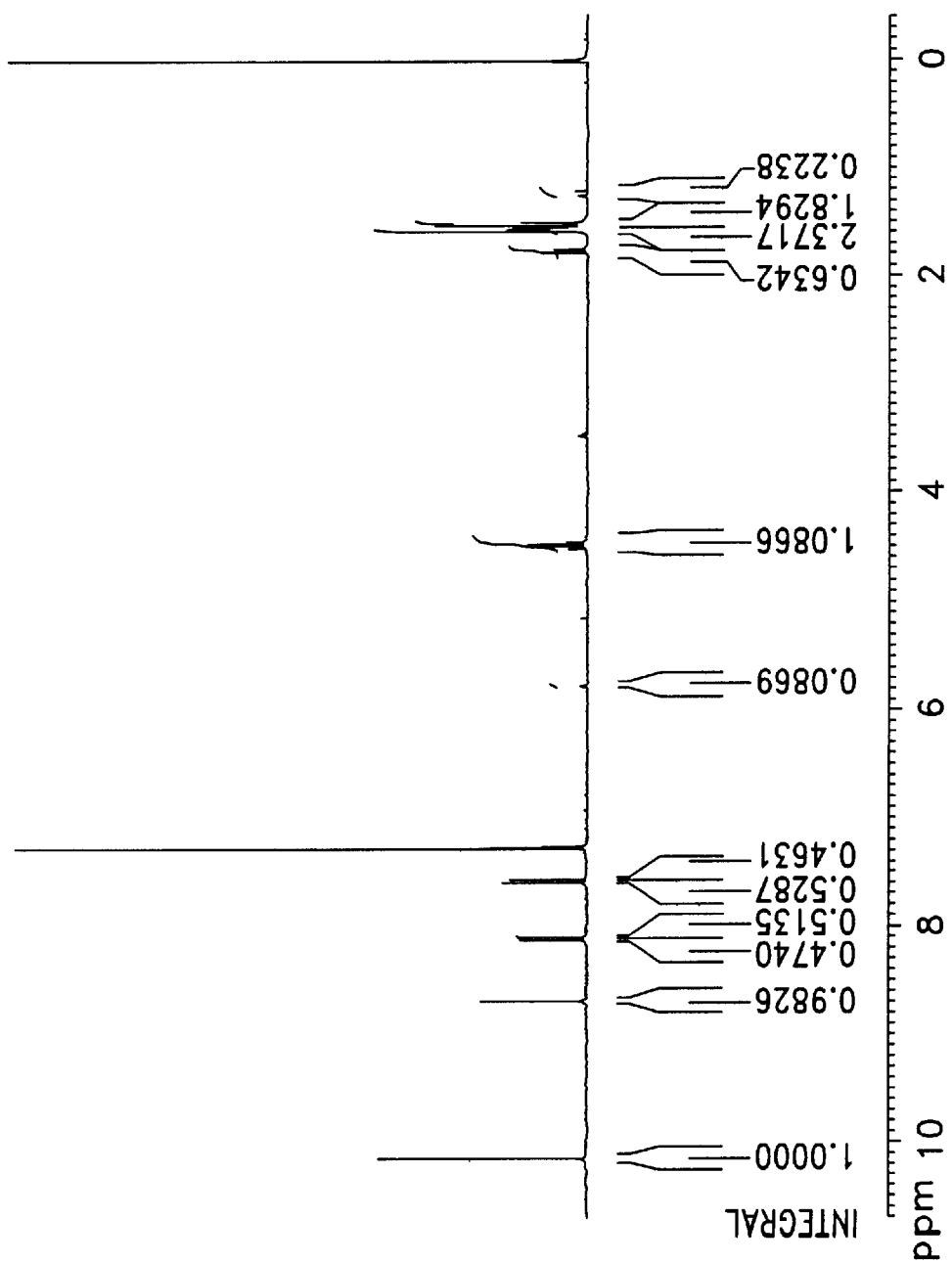
FIG. 6 is a H-NMR spectrum of N-ethyl-3,6-diformyl-carbazole.

(4) Preparation of N-ethyl-3,6-diformyl-carbazole 109 g of DMF was cooled down to 0° C., and 228 g of phosphorous oxychloride was slowly dropped therein. The resultant was heated up to room temperature, and then 30 g of N-ethylcarbazole and 75 ml of 1,2-dichloroethane were dropped therein. The reaction of the mixture was carried out at 90° C. for 20 hours, thereafter the solution was cooled down to room temperature. The solution was poured into 1.5 l of ice water, and extracted with chloroform, dried with anhydrous MgSO$_4$, and was separated with hexane and ethyl acetate in a column. The reaction yield was about 40%. The structure analysis was confirmed by $^1$H-NMR, which was shown in FIG. 6.

(5) Preparation of poly(2,5-dihexyl phenylene-alt-N-ethyl-3,6-carbazole vinylene) Light Emitting Polymer 0.7 g of 1,6-bis(chloromethyl)-2,5-dihexylbenzene triphenylphosphonium salt and 0.2 g of N-ethyl-3,6-diformyl-carbazole were completely dissolved in 10 ml of chloroform solvent and 4 ml of EtOH, which was to carry out the Wittig polymerization. 2.15 ml (1M) of potassium t-butoxide was slowly added to the reactor, and a precipitate was produced on the wall of the reactor. The polymerization was carried out for 6 hours. The polymerization was terminated by adding 1 ml of 1N HCl. The product was put into MeOH, and then a crude EL polymer was separated in the form of powder. And unreacted monomers and oligomers were removed by the Soxhlet apparatus, and the resultant was reprecipitated in MeOH, and a purified EL polymer was obtained with about 60% yield.

Example 2

Preparation of PPDPPO (1) Preparation of 4,4'-dibromo-(2,5-oxadiazole)-1,1'-biphenol (4.4'-dibromo-(2,5-oxadiazole)-1,1'-biphenyl)

0.1 mol (21.5 g) of methyl 4-bromobenzoate and 0.1 mol (3.2 g) of hydrazine were reacted under THF solvent as being refluxed for 6 hours, and the reactant was extracted with ether, and then a compound of the following formula was synthesized:

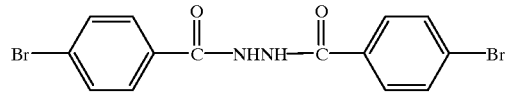

Figure 7:
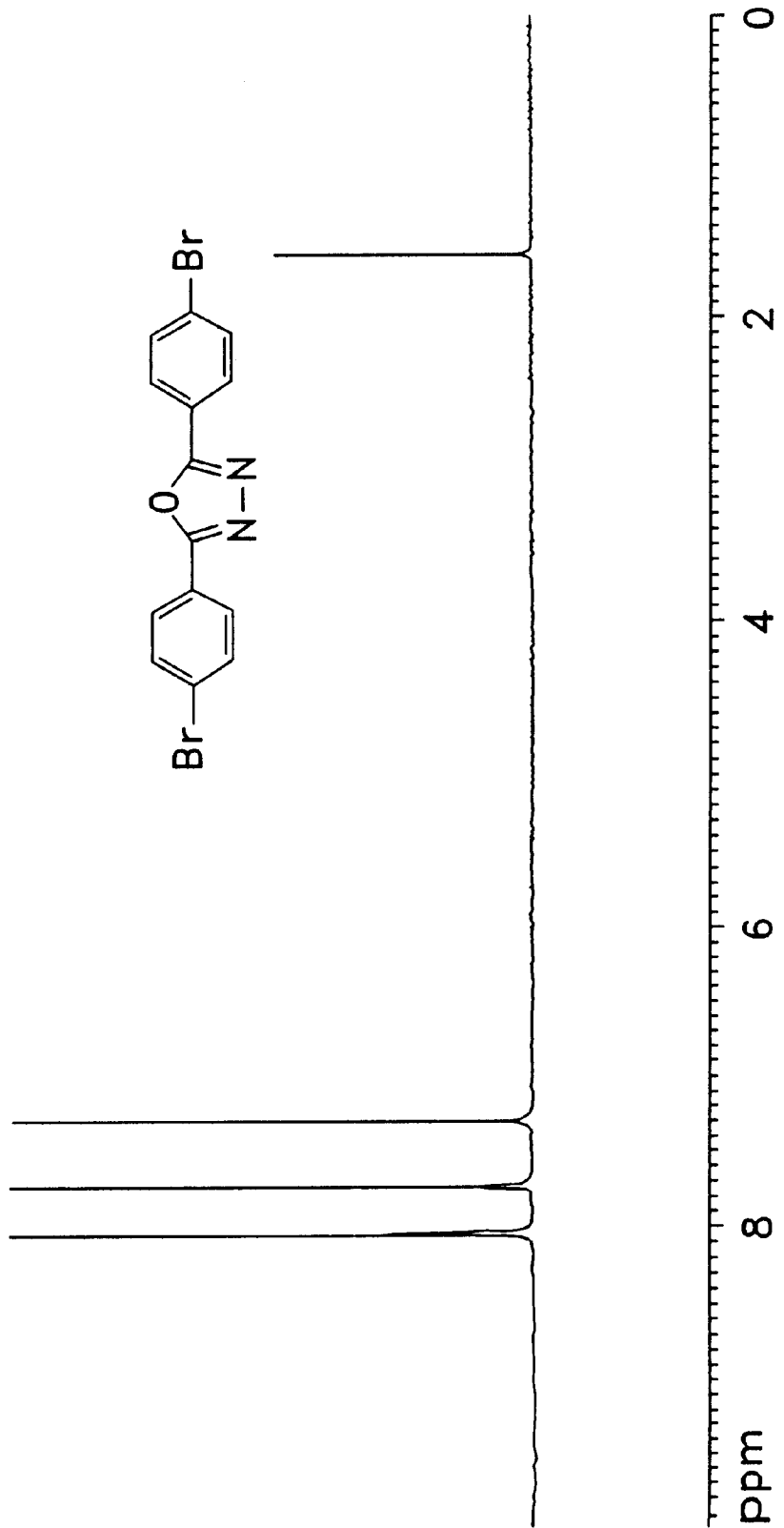
FIG. 7 is a H-NMR spectrum of 4,4'-dibromo-(2,5-oxadiazole)-1,1'-biphenyl.

The obtained compound was reacted under thionyl chloride and toluene as being refluxed for 24 hours, and a compound of the following formula containing oxadiazole was obtained with about 80% yield. The structure analysis was confirmed by $^1$H-NMR, which was shown in FIG. 7.

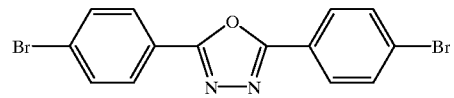

(2) Preparation of 1-methoxy-4-(2-ethylhexyloxy)-2,5-phenylboronic acid 0.1 mol (12.4 g) of 4-methoxyphenol and 0.1 mol (19 g) of 2-ethylbromohexane were gradually reacted with potassium carbonate as a base in DMF solvent as being refluxed for overnight. After the reaction, the resultant was poured in cold water, and a precipitate was produced. The precipitate was filtered and dried to obtain a compound of the following formula with about 80% yield:

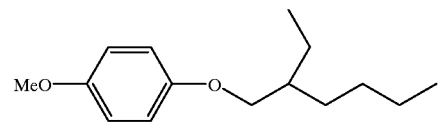

The obtained compound was reacted under Br$_2$ and benzene as being refluxed, and a compound of the following formula was synthesized with about 65% yield:

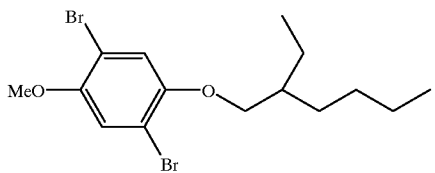

After the obtained compound was reacted with magnesium, the resultant was reacted with trimethyl borate, and a comonomer of the following formula was obtained with about 47% yield:

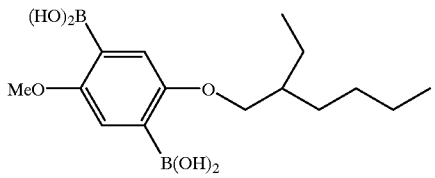

Figure 8:
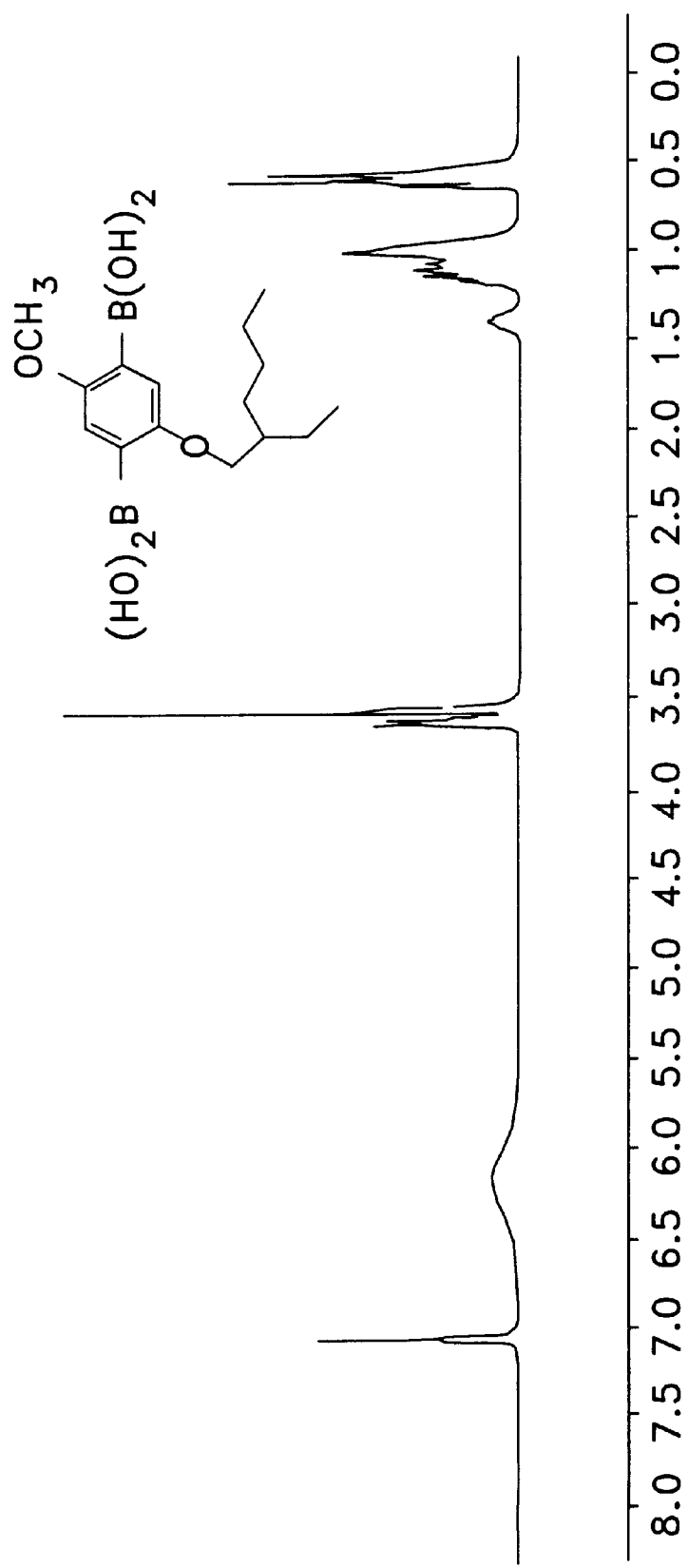
FIG. 8 is a H-NMR spectrum of 1-methoxy-4-(2-ethylhexyloxy)-2,5-phenylboronic acid.

The structure analysis was confirmed by $^1$H-NMR, which was shown in FIG. 8.

(3) Preparation of poly(1,4-phenylene-1',4'-(2',5'-dialkoxy) phenylene-1',4'-phenylene-2,5-oxadiazole Compounds of above (1) and (2) were reacted under potassium carbonate and tetrakis(triphenylphosphine) palladium catalyst for 24 hours to prepare an EL polymer, which was soluble in an organic solvent and contained oxadiazole groups showing an excellent property of electron transporting, as follow:

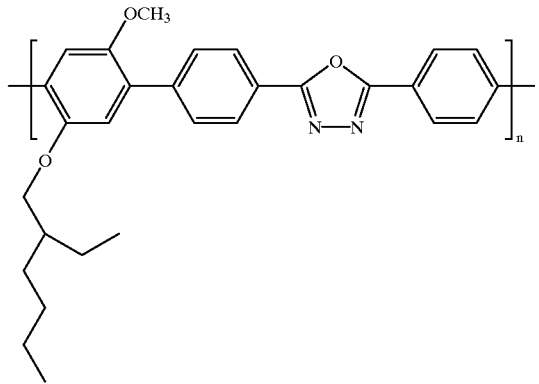

Preparation of Polymer Light Emitting Display:

An ITO cathode coated onto a glass substrate was patterned in stripe type with 3 mm wide, and which was cleaned in the order of a cleaning solution, deionized water, acetone, and IPA.

The electroluminescent polymer solution using 1,2-dichloroethane as a solvent was spin-coated onto an ITO electrode, and evaporating the solvent in a vacuum desiccator at 50° C. over 3 hours.

In case of a single layer type EL device, an anode was deposited on the polymer layer. And in case of a layer-built type EL device, a lower molecular dye was deposited, thereafter, an anode was deposited on the polymer layer.

Aluminum having a purity of 99.99% was used for an electrode material, because it was stable in the air although the work function was high. After setting a Shadow mask for an anode, and an Al wire was placed in a tungsten wire (pin-type or helix-type) heater, and the vacuum pressure was kept to $1.0 \times 10^{-5}$ Torr. After reaching the desirable vacuum pressure, the heater was heated to melt Al. The deposition was started at the appropriate deposition rate. The deposition rate and thickness of the layer was measured by means of a quartz resonator.

The obtained sample was handled under nitrogen gas to avoid contacting with the air. A positive line was connected to the ITO layer, and a negative line was connected to the Al layer.

Figure 9:
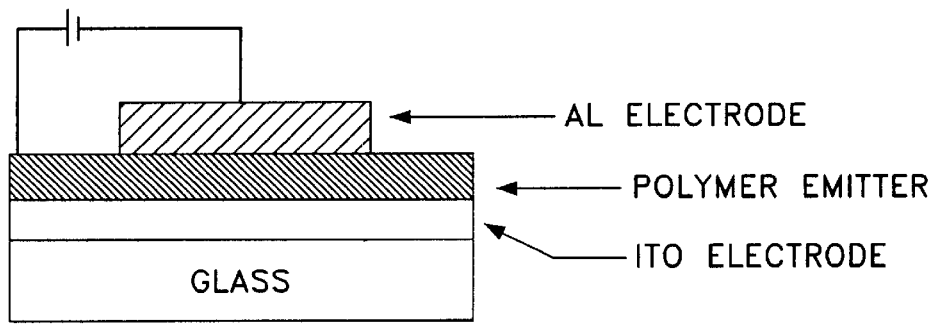
FIG. 9(A) is a schematic cross-sectional view of a single layer device.
FIG. 9(B) is a schematic cross-sectional view of a multilayer device.
Figure 9:
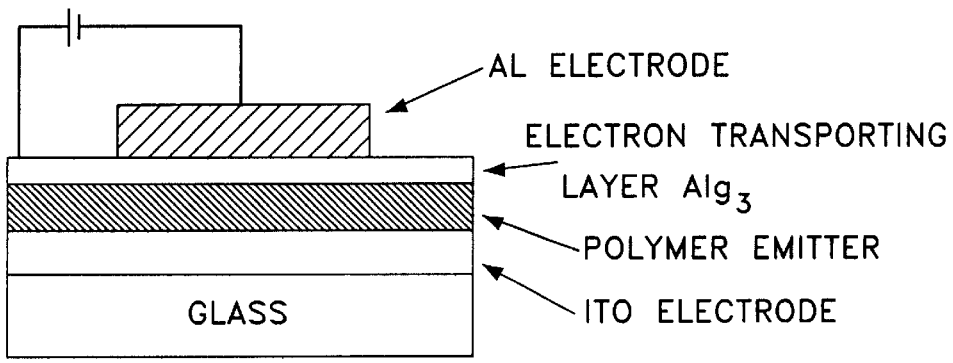

In the structure of the EL cell in accordance with the present invention, the polymer light emitting layer was sandwiched between ITO layer and Al layer, in which the contact area of the light emitting part therewith was 6 mm. The sectional view of an organic EL device was shown in FIG. 9.

UV-visible Spectrum of Polymer Film:

A synthesized polymer of PDPCVz and PPDPPO was soluble in an organic solvent such as THF, chloroform, etc., and the thin film fabricated from the polymer was free of pin holes and any defects to allow to obtain uniform film, and also the adhesion to a substrate was excellent.

Figure 10:
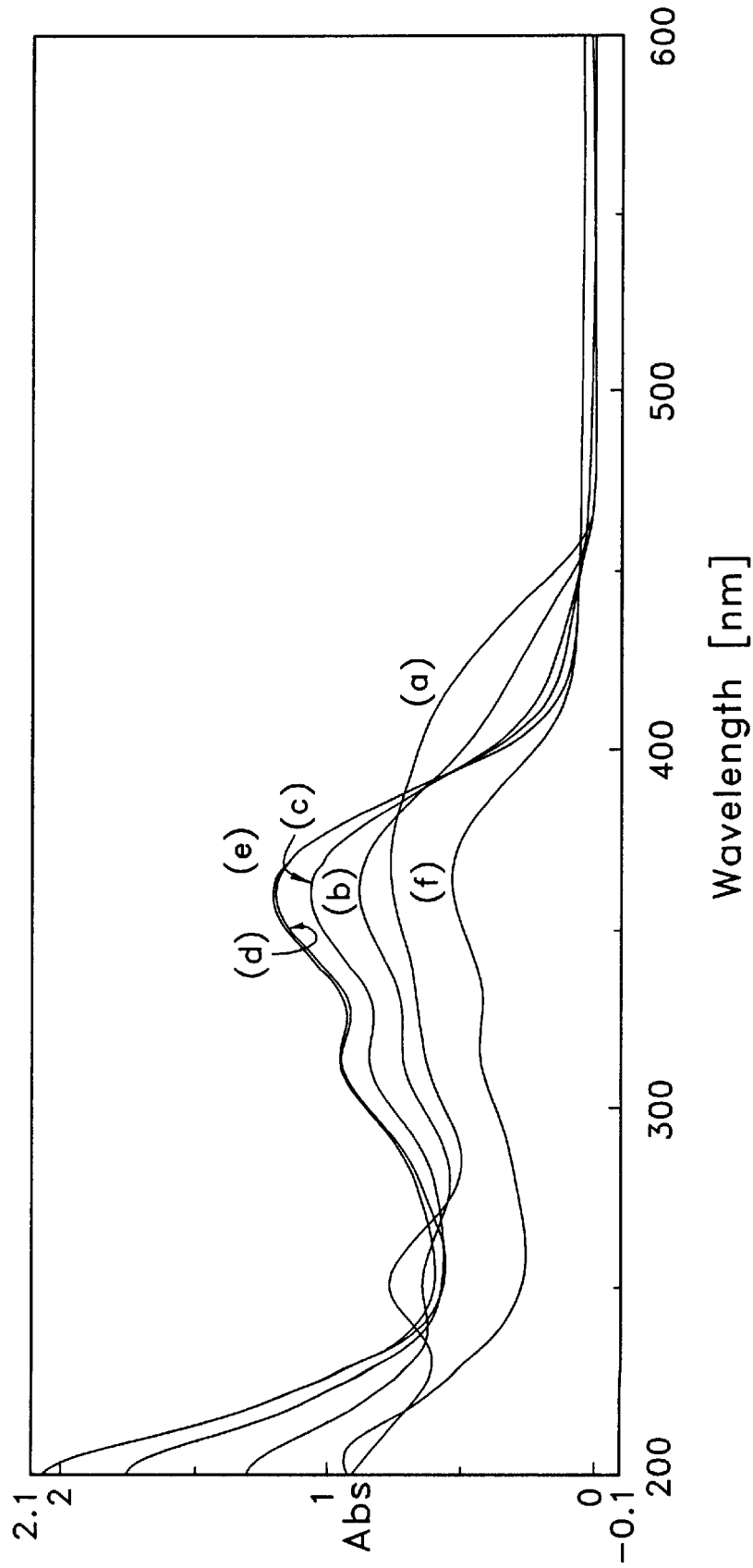
FIG. 10 is UV-Visible spectra of films of polymer blends of PDPCVz and PPDPPO.

FIG. 10 shows a UV-visible absorption spectrum of PDPCVz, PPDPPO and a blend of those.

PDPCVz (a) had a maximum peak at 370 nm, PPDPPO (f) had peaks at 320 nm and 366 nm, which showed UV-absorption wavelength of bimodal shape.

When the blend ratio of PDPCVz and PPDPPO was varied as 100/0, 50/50, 17/83, 9/91, 5/95 and 0/100, the strength of each peak was proportioned to the concentration of the PPDPPO. According to the blend ratio, the position of the maximum absorption wavelength was not changed. It was found that there were no changes of peaks between a new peak and an old peak, so that there were no interactions between PDPCVz and PPDPPO at the ground state.

PL Spectrum of Polymer Film:

PL is a phenomenon that a molecular is excited by light, and electron and hole in a single exciton state are combined, and a light is emitted in a process of the recombination and the extinction of those. The wavelength of an incident light is varied with the optical absorption of the polymer.

Figure 11:
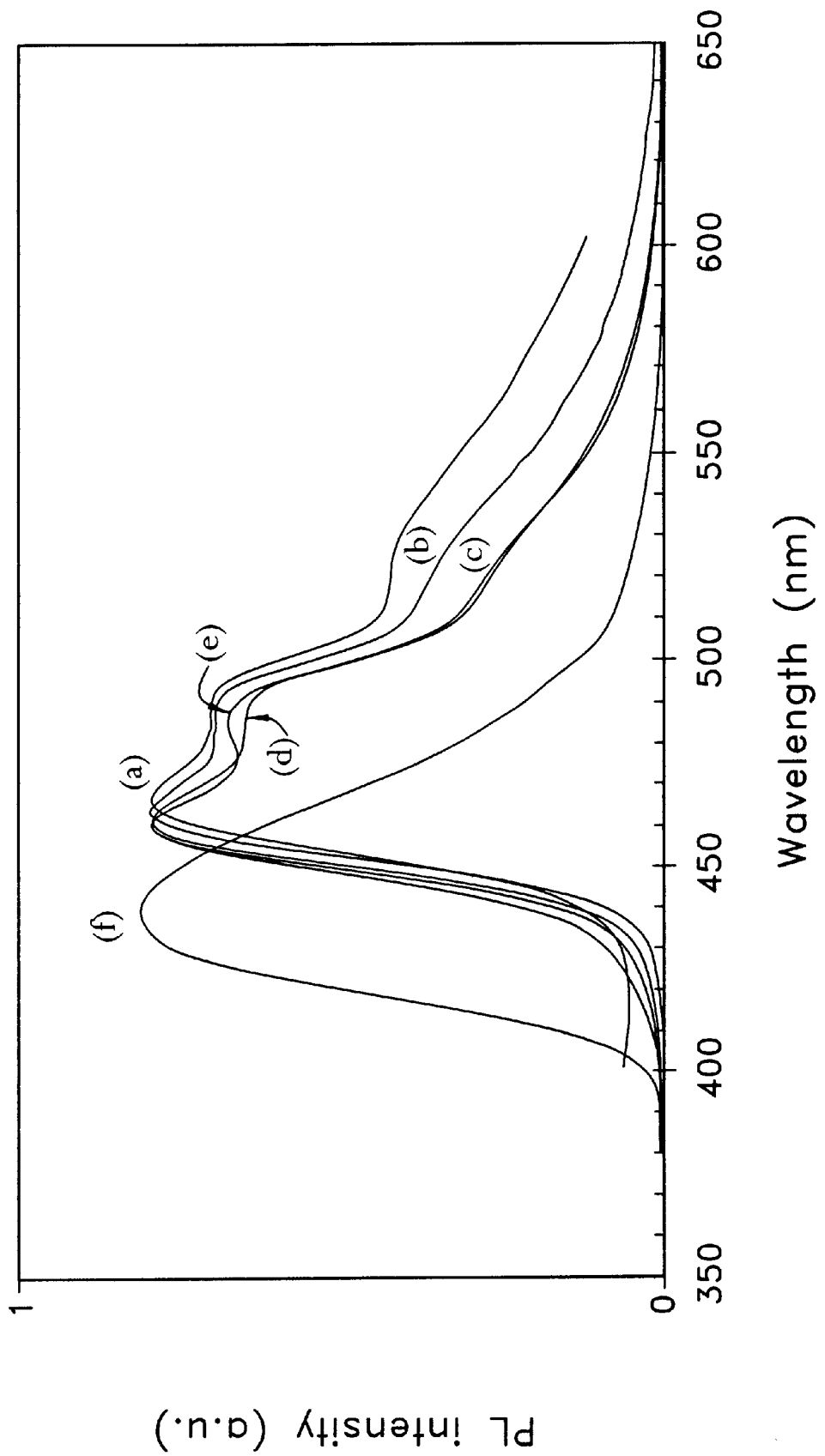
FIG. 11 is PL spectra of films of polymer blends of PDPCVz and PPDPPO.

When the polymer films of PDPCVz and/or PPDPPO prepared by spin-coating with a solution of 1% by weight of 1,2-dichloroethane were excited at 370 nm, the measured PL spectrum was represented in FIG. 11.

A film of PDPCVz (a) had peaks at 468 nm and 490 nm, and a greenish blue light could be observed at 520 nm due to an affect of shoulder. A film of PPDPPO (f) showed a maximum light emitting peak at 440 run (stokes shift: 70 nm). It was shown that a PL maximum peak wavelength of solid film state was red-shifted to about 10 nm, more than the PPDPPO solution using chloroform as a solvent. It is believed that the light emitting spectrum of polymer dilute solution was produced as being extinguished a single exciton of a single chain or isolated chromophoric group, whereas an exciton of a solid film, unlike a solution state, was extinguished in a lower energy state by the interaction between moleculars.

To solve a concentration quenching in a solid film state and to obtain the same effect in a dilute solution by diminishing the interchain interaction in a solid state, a method that could obtain the dilution effect by blending in a constant ratio of different polymers has been applied in many ways. The method hindered an eximer formation by virtue of the interaction of moleculars, so that a light emitting region was controlled and a probability of radiative recombination became higher, therefore a luminous efficiency was increased.

As methods of blending a light emitting polymer with other polymers, an inert polymer such as polystyrene, polycarbonate, etc. may be used as a polymer matrix, or at least two EL polymers were blended. The latter is a method that can improve the luminous efficiency, and that can control the light emitting region by transferring energy from an EL polymer having a high band energy to an EL polymer having a lower band energy.

As shown in the PL spectrum of FIG. 11, in case of a blend film of PDPCVz and PPDPPO, the only light emitting peak from single component of PDPCVz could be observed, regardless of the content of the PPDPPO. According to increasing the content of PPDPPO, the maximum PL peak from PDPCVz was blue-shifted to about 10 nm, which was caused by the chain conformation effect. It was found that the PL strength of a blend film according to the content ratio of blend was increased more than that of the film of a single component of PDPCVz. Also, when the ratio of PDPCVz:PPDPPO was 17:83, the maximum value of the effect was shown, and in the range of over 90% of PPDPPO, no more big difference was shown.

Figure 12:
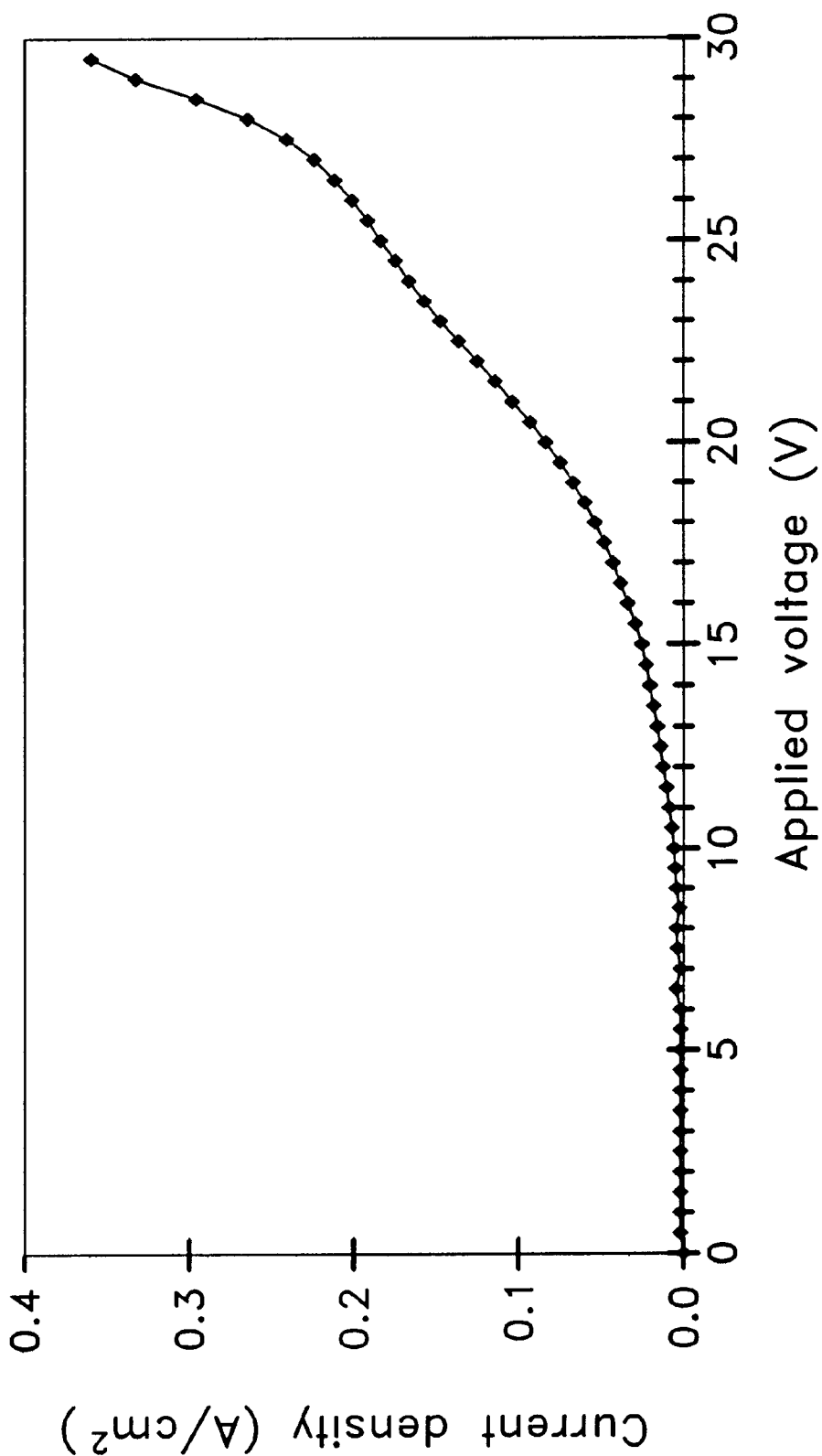
FIG. 12 is a voltage-current density curve of a light emitting device having a structure of ITO/PDPCVz/Al.

Electroluminescent Characteristic of PDPCVz:

A single layer-type EL device having a structure of [ITO/PDPCVz/Al], in which PDPCVz was used as a light emitting material, was prepared, and a DC voltage was applied. The current characteristic was represented in FIG. 12.

It was shown that as starting to introduce a current from 5 V, a characteristic of diode was well represented.

Figure 13:
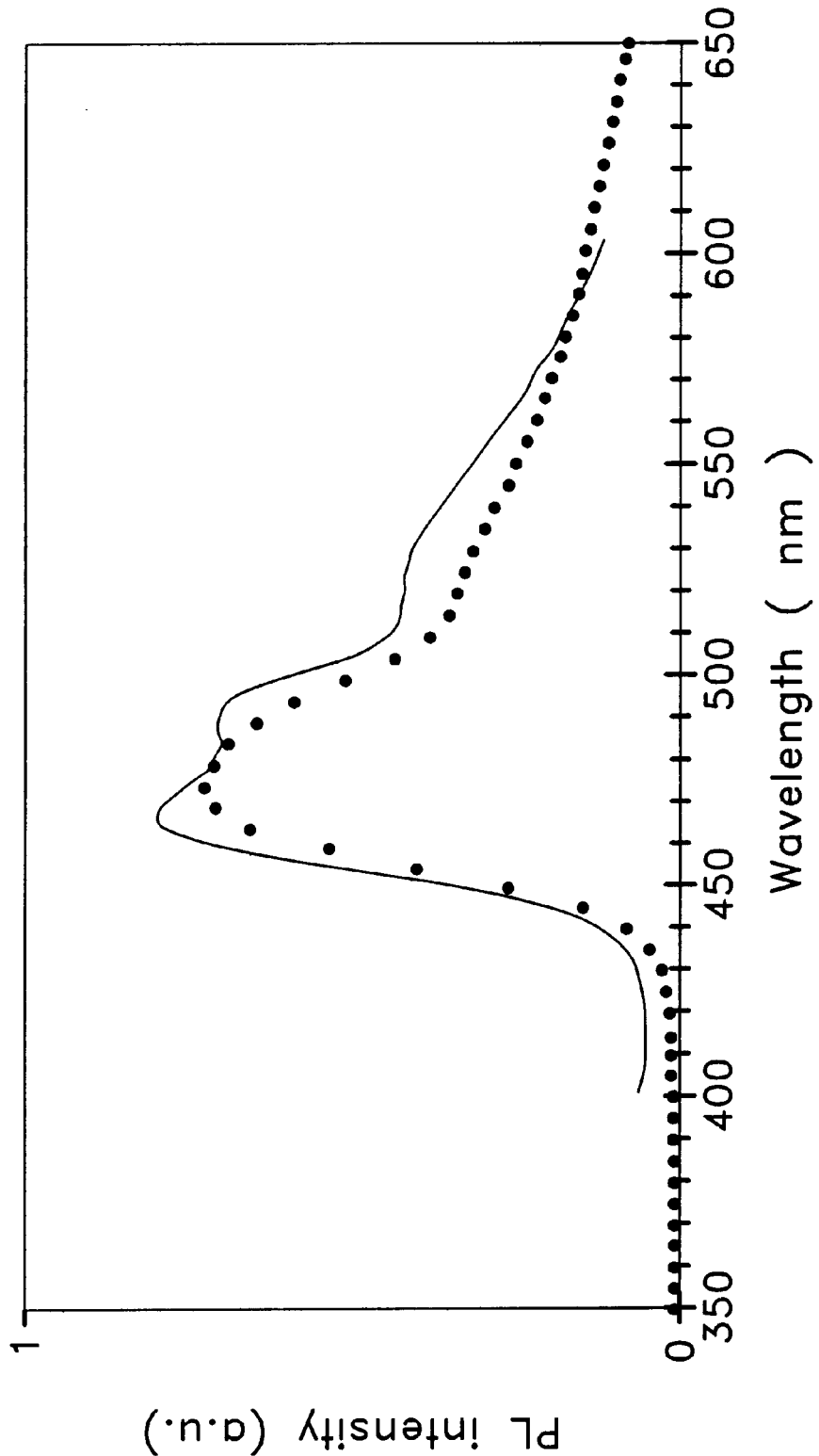
FIG. 13 is EL spectrum and PL spectrum of a light emitting device having a structure of ITO/PDPCVz/Al.

FIG. 13 describes an EL light emitting spectrum of PDPCVz and a (PL) spectrum at 370 nm of an excited wavelength. An EL light emitting peak at 475 nm, which was conformed to a fluorescence of PDPCVz, was shown. A light emitting of greenish blue was observed at 520 nm by a shoulder effect.

Figure 14:
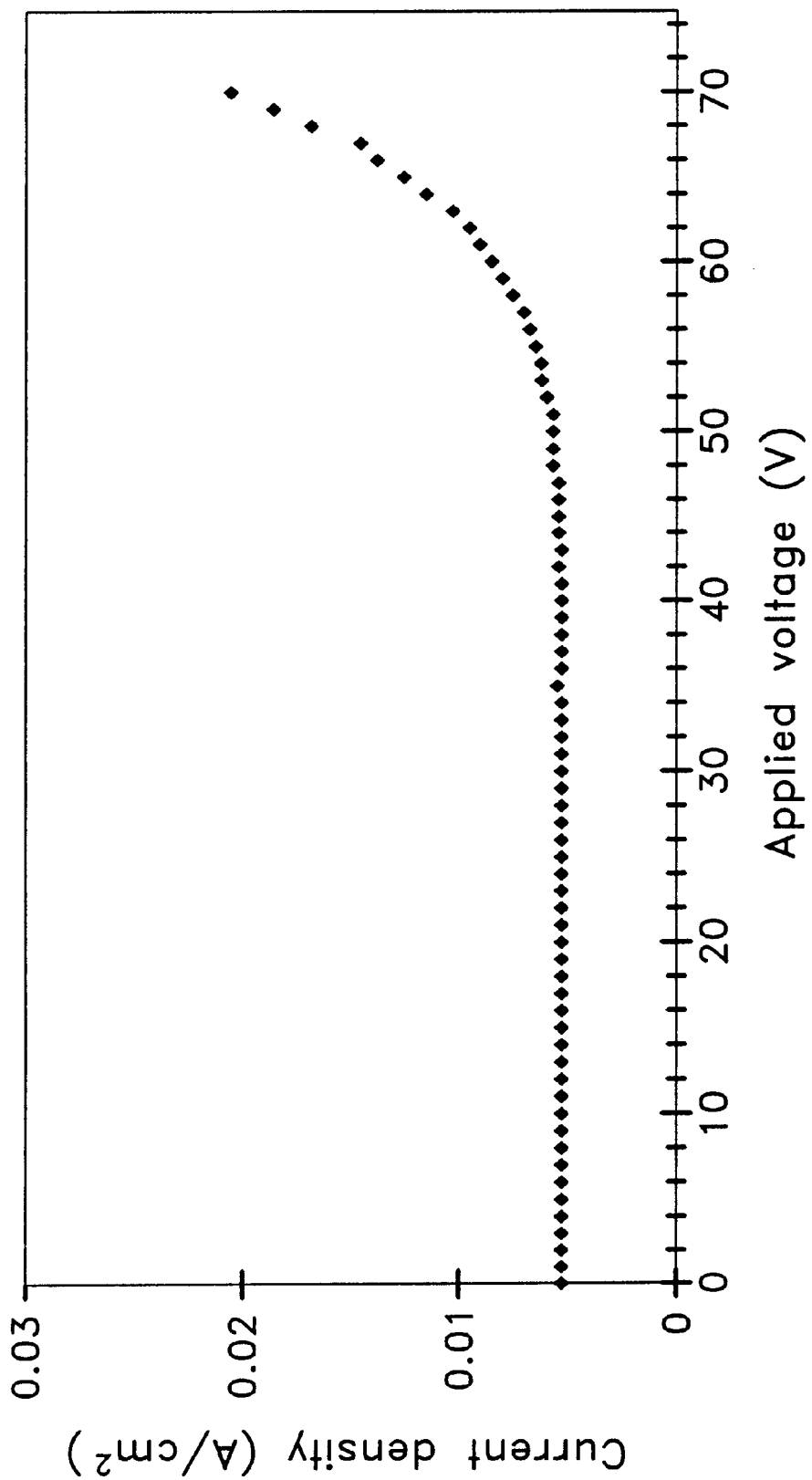
FIG. 14 is a voltage-current density curve of a light emitting device having a structure of ITO/PDPCVz/Al.

Electroluminescent Characteristic of PPDPPO:

FIG. 14 describes a voltage-current density characteristic of [ITO/PPDPPO/Al] which was a single layer-type EL device using PPDPPO as a light emitting layer. As shown in FIG. 14, in order to apply a current to PPDPPO, at least 40 V of an applicable voltage was required, and a device was destroyed at over 70 V. A current started to flow at about 40 V of forward bias, and a weak blue light became visible to the naked eyes at about 50 V of forward bias, and also a value of a current density was low.

It was shown that the voltage-current density characteristic after repeatedly driving the [ITO/PPDPPO/Al] device was mostly the same as the initial current value.

Electroluminescent Characteristic of Blend of PDPCVz and PPDPPO:

Films prepared by changing the ratio of PDPCVz of a greenish light emitting material and PPDPPO having an electron transporting property were used for light emitting layers. A single layer EL device of an [ITO/PDPCVz:PPDPPO/Al] structure using the above light emitting layer was fabricated, and the electroluminescence characteristic was appraised.

Figure 15:
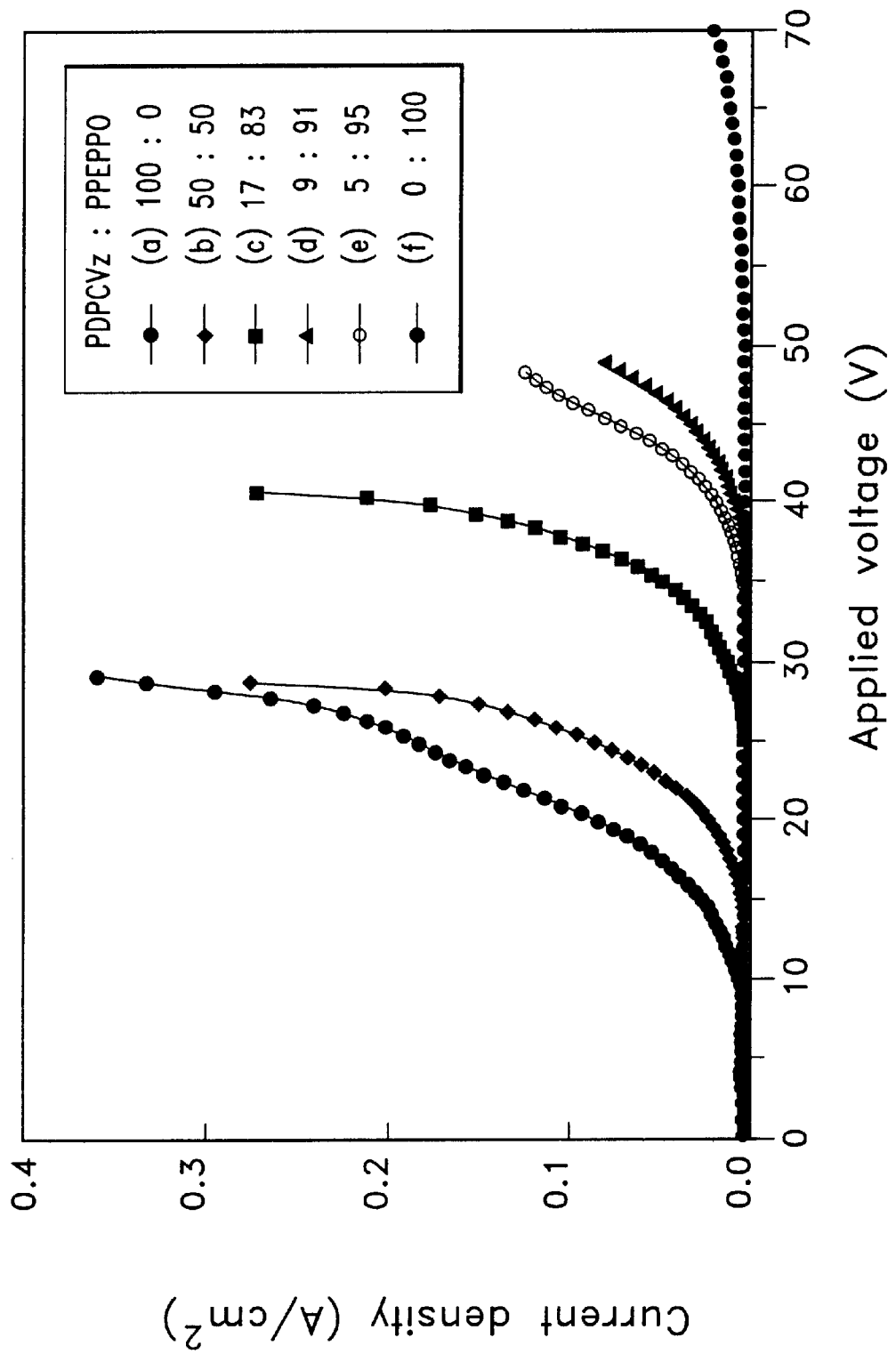
FIG. 15 is voltage-current density curves of a light emitting device having a structure of ITO/(PDPCVz & PPDPPO)/Al.

FIG. 15 describes a voltage-current characteristic of an EL device using a blend layer, in which the weight ratio of PDPCVz:PPDPPO was controlled like 100/0, 50/50, 17/83, 9/91, 5/95 and 0/100.

Figure 16:
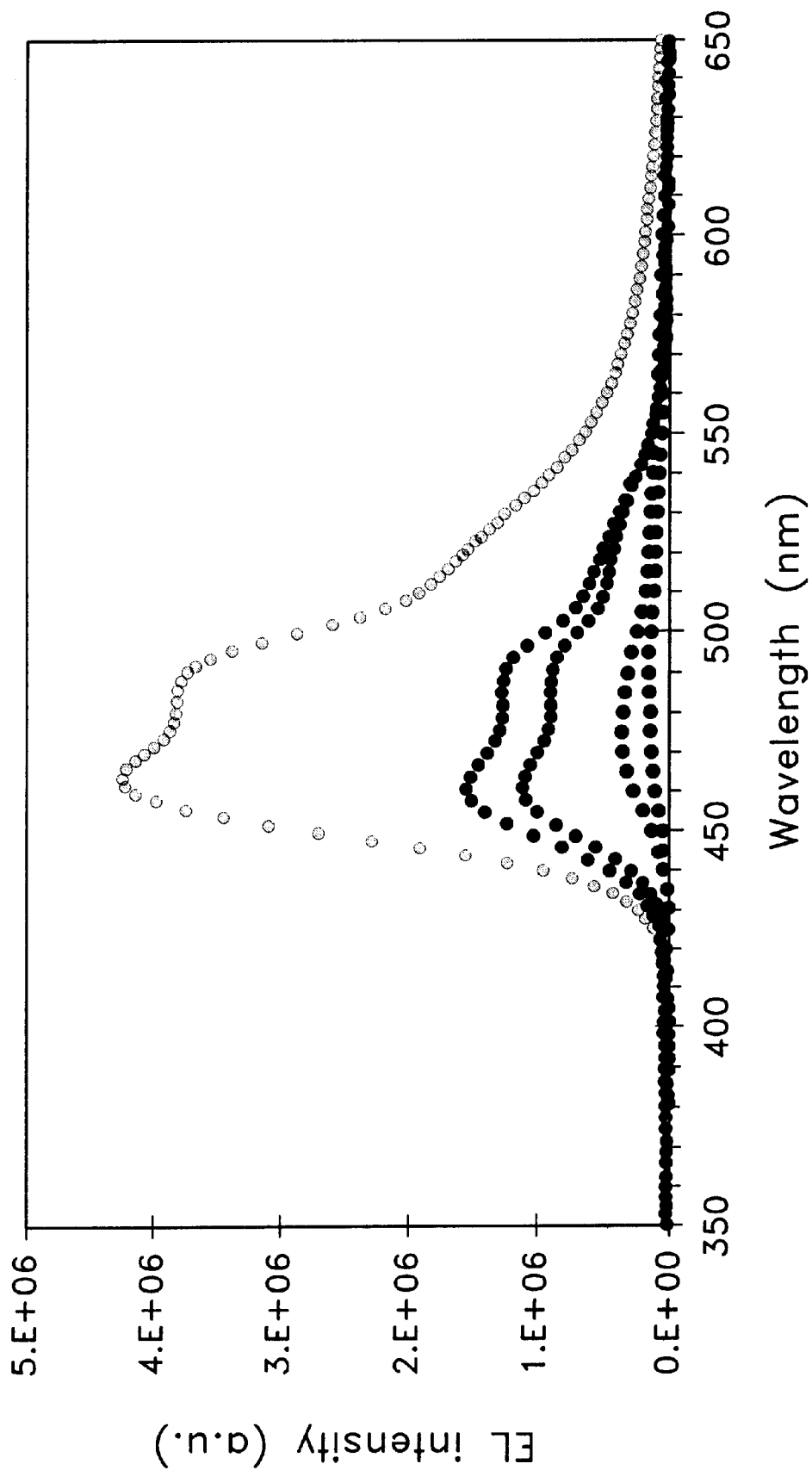
FIG. 16 is EL Spectra of films of polymer blends of PDPCVz and PPDPPO.

As mentioned above, the turn-on voltage of the device using only PDPCVz for a light emitting layer was below 10 V, but according to increasing the content of PPDPPO, there was an increasing tendency in the turn-on voltage, which described well the current characteristic. FIG. 16 describes a change of an EL spectrum according to the blend ratio of PDPCVz:PPDPPO. As shown in FIG. 16, a blend of homo PDPCVz and PPDPPO showed the maximum light emitting peak at 460 nm, which was conformed to the spectrum of PDPCVz itself. Also, a peak around 440 nm which was a light emitting region of PPDPPO was not observed, so that it was confirmed that the light was emitted from PDPCVz, regardless of the ratio of the blend.

According to the blend ratio, an EL efficiency of the blend was suddenly increased, which is more than that of PDPCVz itself. When the content ratio of PDPCVz:PPDPPO was 17:83, the EL efficiency was the best. It was believed that the oxadiazole group of PPDPPO functioned as an electron transporting material, so that the recombination efficiency was raised by the appropriate balance of hole and electron, and the dilution effect was also worked for the EL efficiency.

Figure 17:
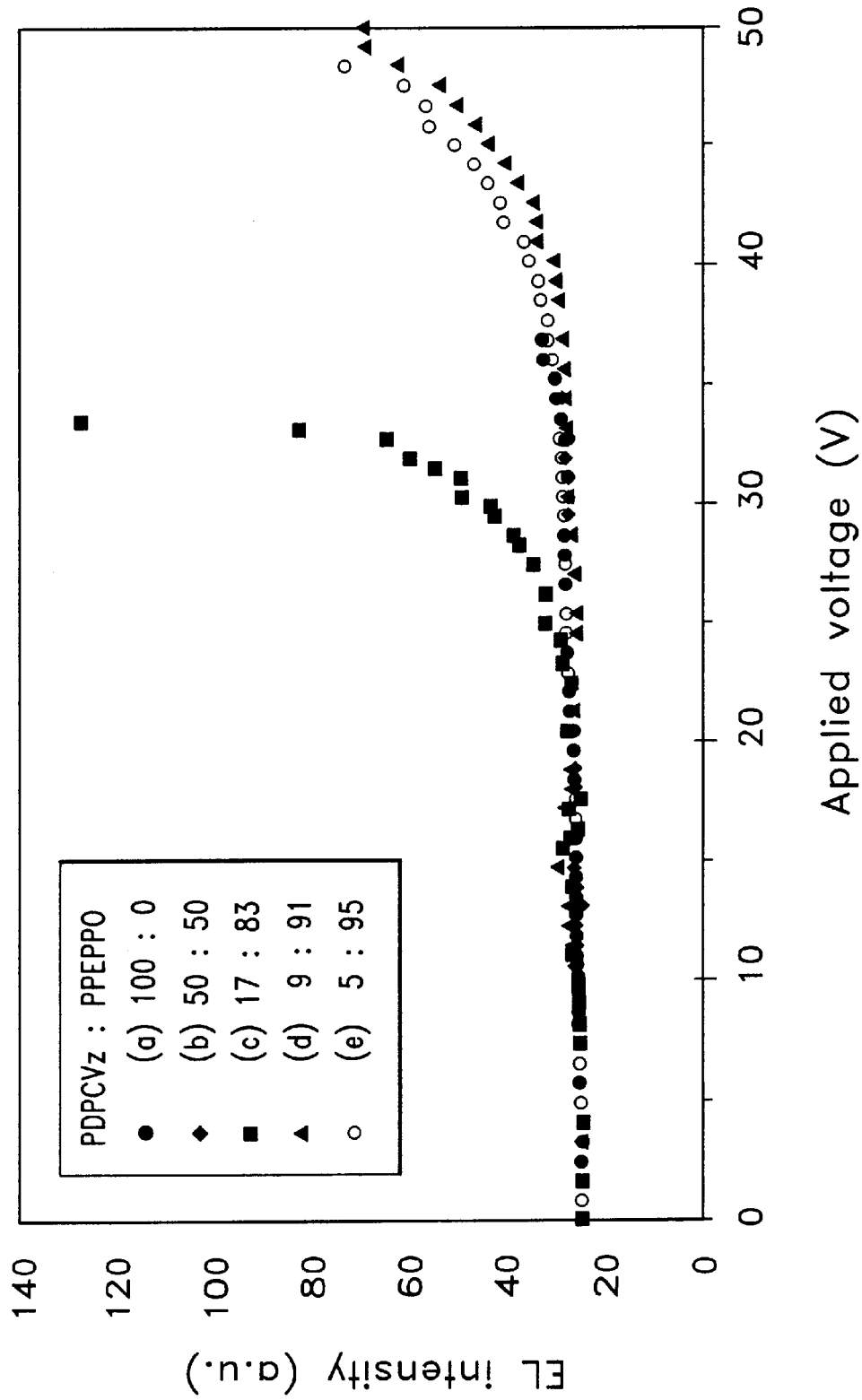
FIG. 17 is EL intensity curves of polymer blends of PDPCVz and PPDPPO.

FIG. 17 describes a change of an EL intensity according to the applied voltage for a blend device. It was difficult to measure the initial luminance because of the resolving power problem in the luminance measuring instrument, so that the initial luminescence was not recorded. But, it was observed that the luminescence was started at about 10 V with no big difference of the content from the blend device. In case that the blend ratio of PDPCVz:PPDPPO was 17:83, the EL intensity was suddenly risen. It was shown that the curves of (d) and (e), in which the content of PPDPPO was over 90%, had no big difference. Such tendency illustrates that there was a tendency to conform to the change of PL intensity according to the blend ratio.

Electroluminescence Characteristic of [ITO/(PDPCVz & PPDPPO)/Alq$_3$/Al] device:

An [ITO/PDPCVz:PPDPPO/Alq$_3$/Al] structure device was prepared by layer-building an electron transporting layer (Alq$_3$) having the thickness of 20 nm on the blend film of PDPCVz and PPDPPO, and the EL characteristic was appraised.

Figure 18:
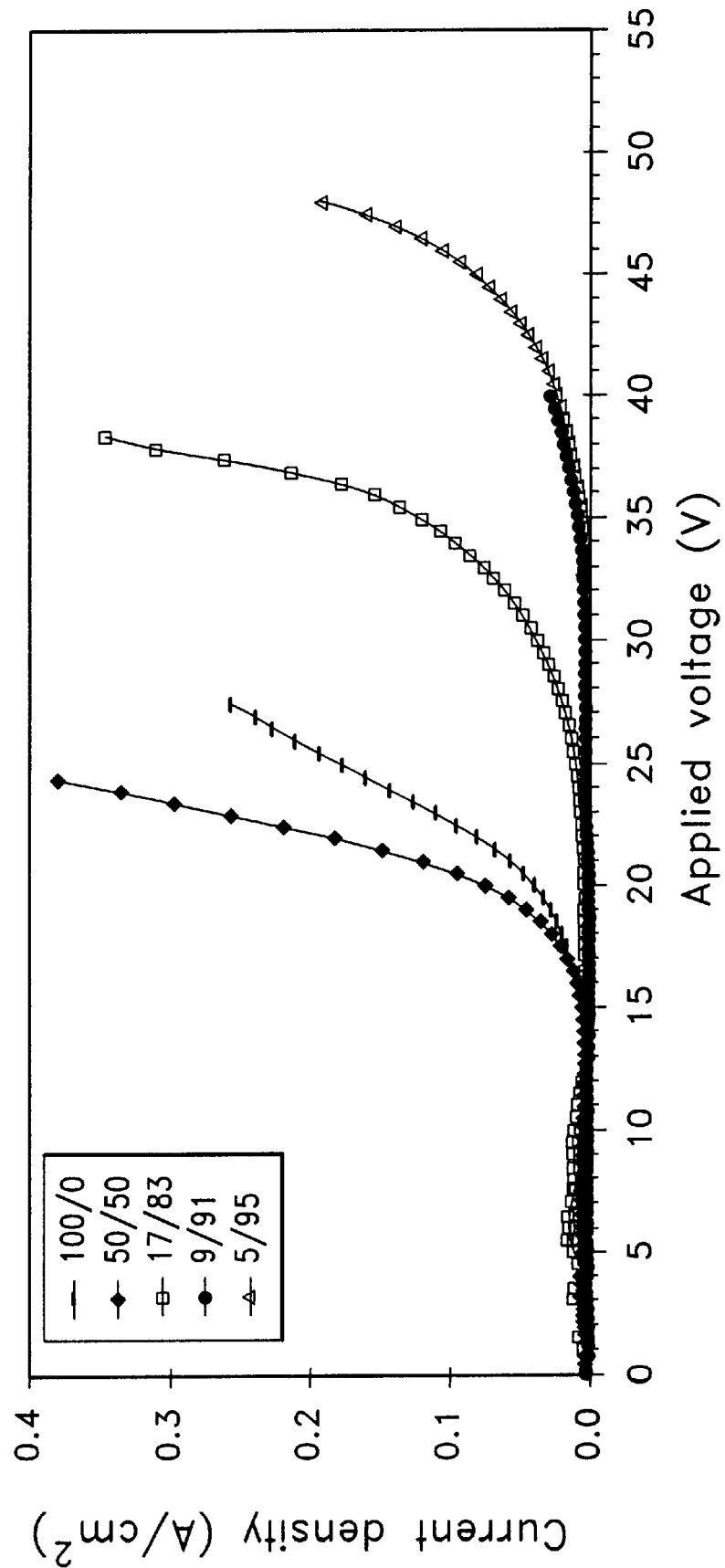
FIG. 18 is voltage-current density curves of devices having a structure of ITO/(PDPCVz & PPDPPO)/Alq$_3$/Al.

FIG. 18 describes a voltage-current characteristic of the layer-built type device.

Figure 19:
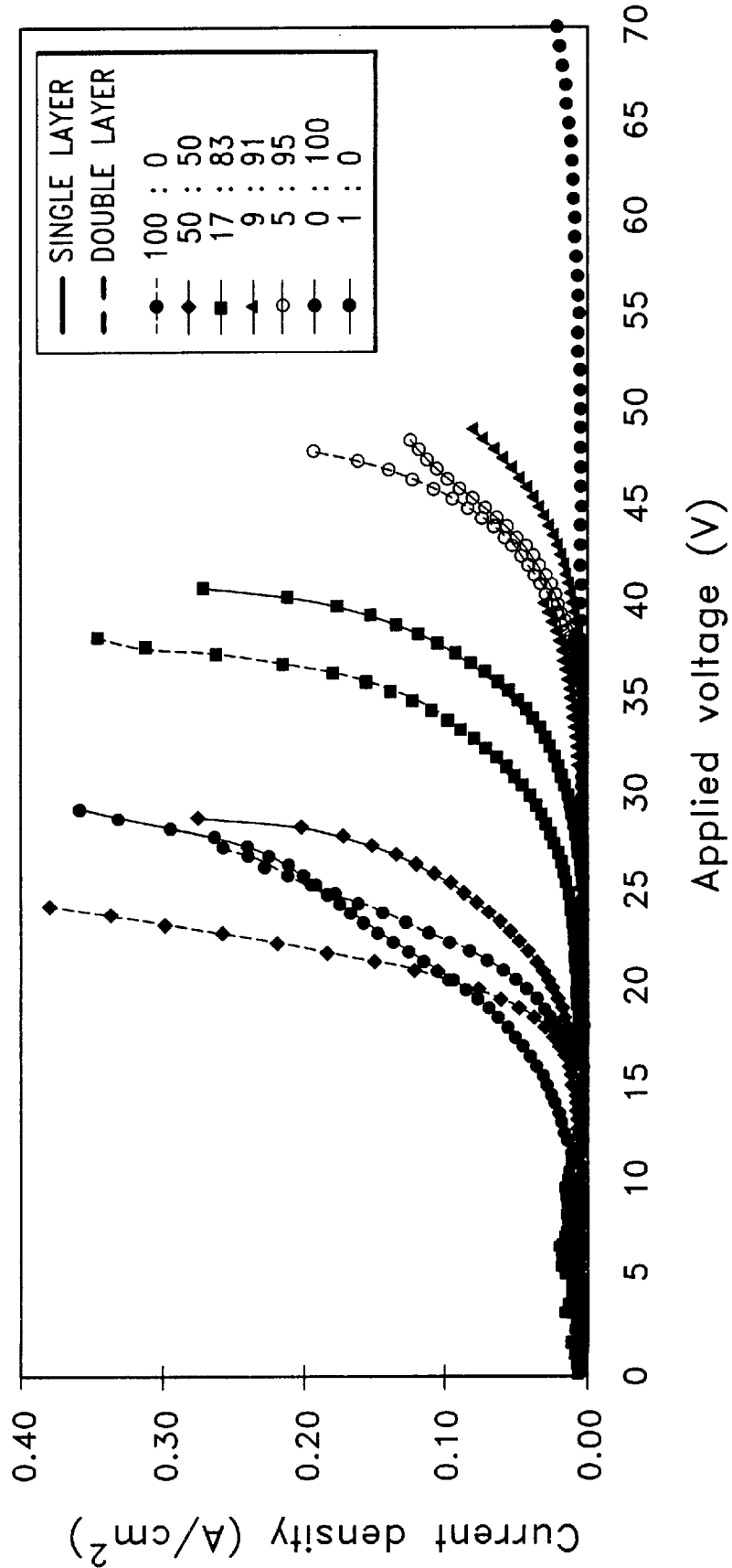
FIG. 19 is voltage-current density curves of devices having structures of ITO/(PDPCVz & PPDPPO)/Al and ITO/(PDPCVz & PPDPPO)/Alq$_3$/Al.
Figure 20:
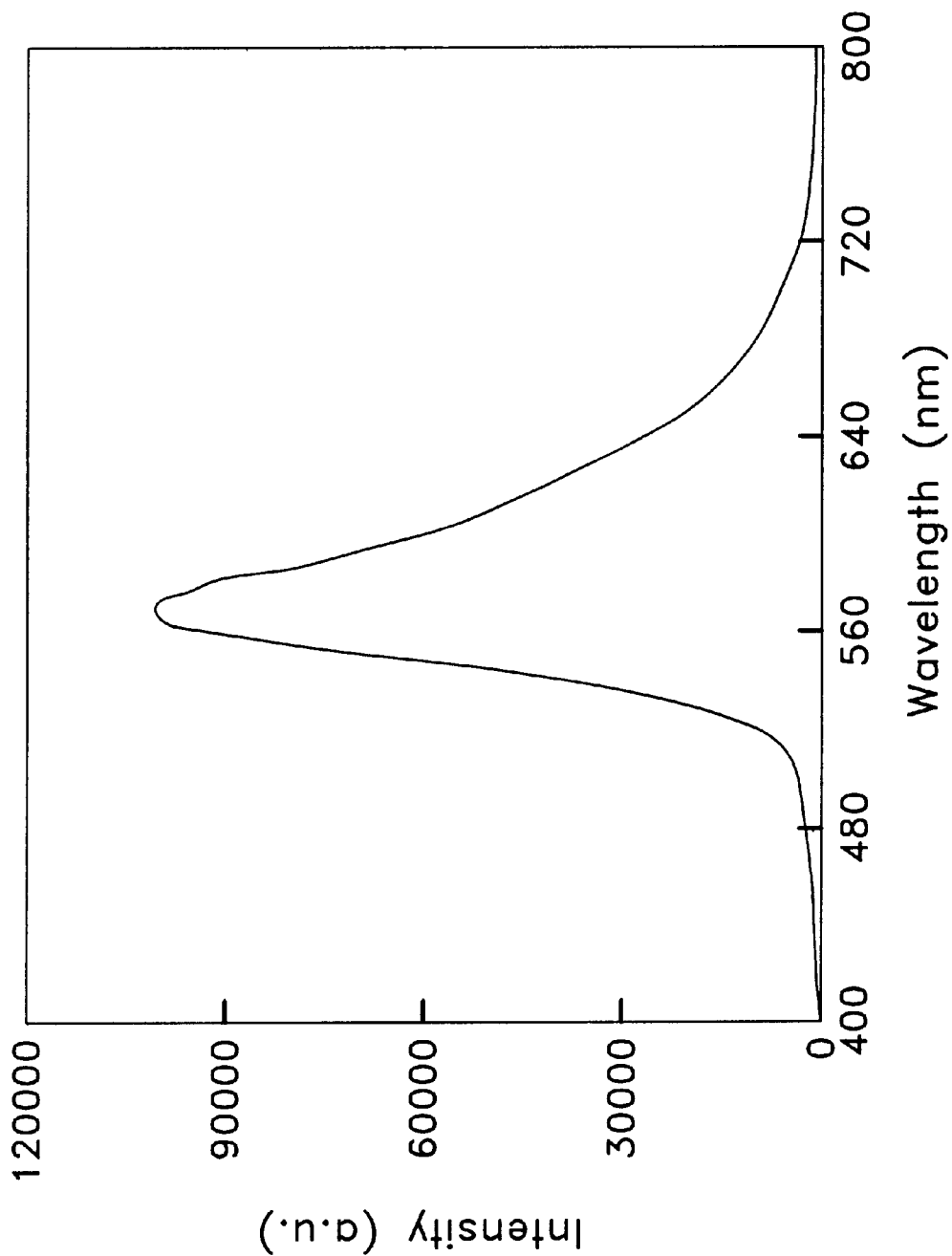
FIG. 20 is a EL Spectrum of an EL display employing a conventional methyl ethyl hexyloxy-poly(p-phenylene vinylene) (MEH-PPV)

Likewise the device of a single layer structure, it was shown that the turn-on voltage was raised according to increasing the blend content of PPDPPO. In order to find out the effect of the Alq$_3$ layer, voltage-current characteristics of a single layer of [ITO/PDPCVz:PPDPPO/Al], and a multi-layer of [ITO/PDPCVz:PPDPPO/Alq$_3$/Al] were compared in FIG. 19.

It was shown that the turn-on voltage of a layer-built type device was low in comparison with a single layer type device regardless of the blend ratio, excepting a film with 100% of PDPCVz.

It was believed that the injection efficiency of electron was improved by sandwiching a thin film of the Alq$_3$ layer between a polymer film and an Al electrode, so that the contact between the films was improved, and also Alq$_3$ was not recombined and was worked to control the migration of holes to the anode.

COMPARATIVE EXAMPLE

Figure 21:
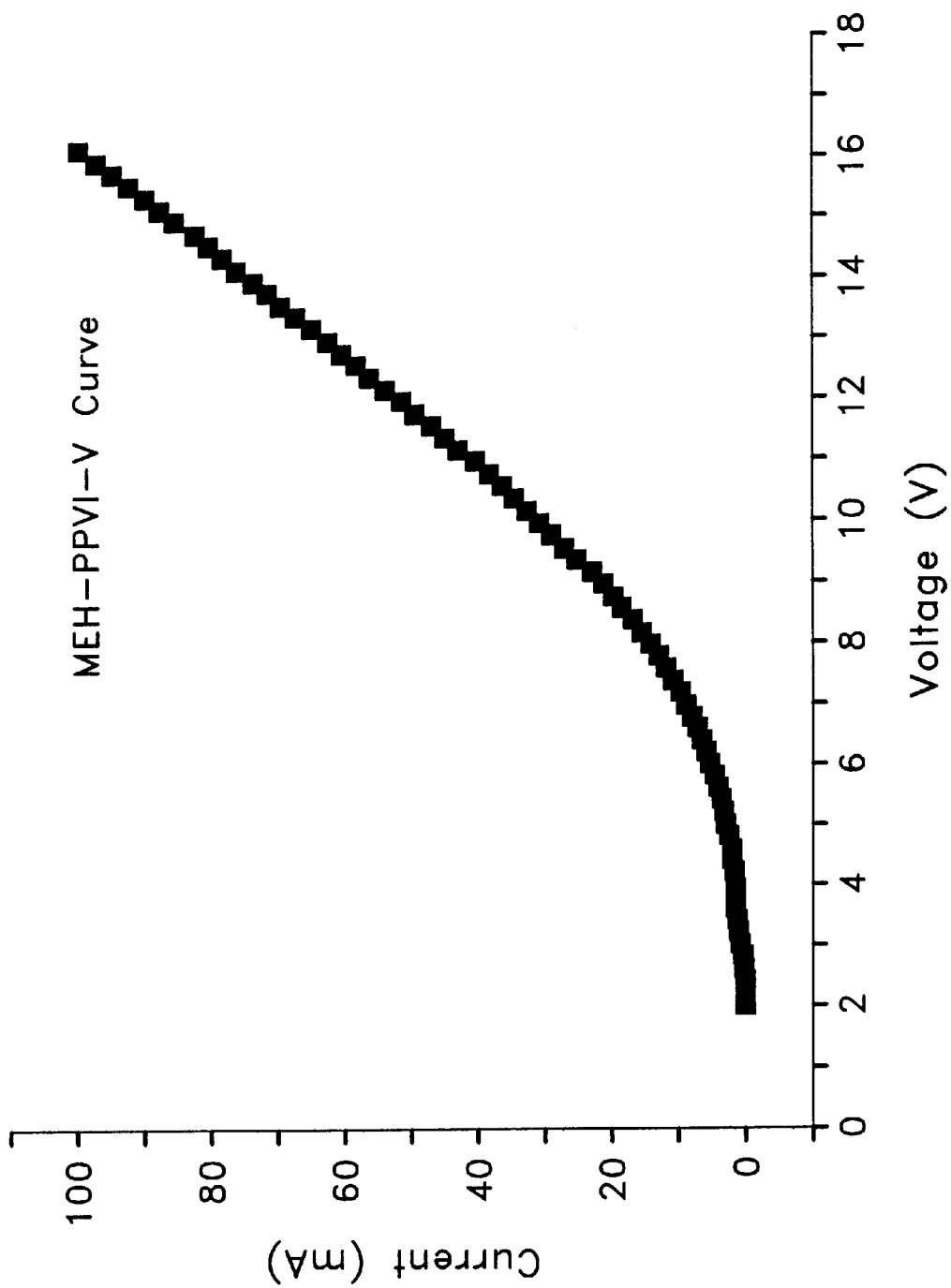
FIG. 21 is a voltage-current curve of an EL display employing MEH-PPV.

As the EL polymer, MEH-PPV was used. The electroluminescence characteristic was compared. FIG. 21 describes an electroluminescence spectrum at 10 V, and it was found that a luminance was shown in blue region. FIG. 22 describes a current-voltage curve in case of using MEH-PPV as a luminescence layer. It was found that the turn-on voltage started to flow at 7 V.

The present invention can be easily carried out by an ordinary skilled person in the art. Many modifications and changes may be deemed to be within the scope of the present invention as defined in the following claims.

What is claimed is:

1. A light emitting polymer for an electroluminescent (EL) display represented by the formula (I):

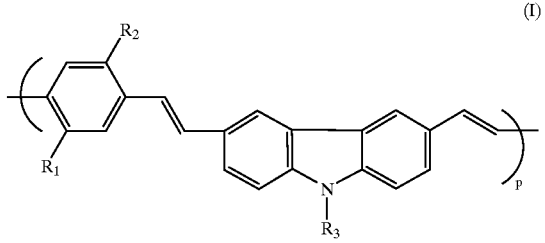

wherein $R_1$, $R_2$ and $R_3$ are the same or different, and represent a long chain aliphatic alkyl or branched aliphatic alkyl group, said long chain aliphatic alkyl group being represented as —$(CH_2)_n CH_3$, and said branched aliphatic alkyl group being represented as —$CH_2CHCH_3(CH_2)_n CH_3$, where n=1–12 and p is an integer of 5–100.

2. A light emitting polymer for an EL display represent by the formula (II):

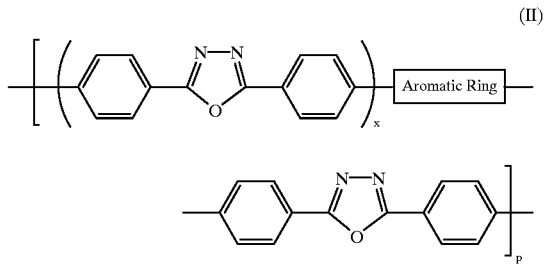

wherein x is 0 or 1, p is an integer of 5–100, and Aromatic Ring is represented by

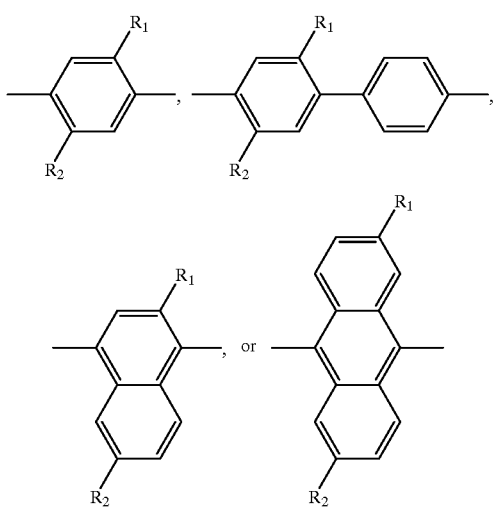

wherein $R_1$ is aliphatic alkyl or aliphatic alkyloxy, $R_2$ is branched alkyl or branched alkyloxy, said aliphatic alkyl represented as $(CH_2)_n CH_3$, where n=1–12, and aliphatic alkyloxy represented as $(OCH_2CH_2)_m CH_3$, where m=1–4, said branched alkyl represented as $CH_2CHCH_3(CH_2)_n CH_3$, where n is 1–12, and said branched alkyloxy represented as $OCH_2CHCH_3(CH_2)_n CH_3$, where n is 1–12.

3. A light emitting polymer for an EL display comprising:

a light emitting polymer of claim 1; and at least one polymer selected from the group consisting of polystyrene, polycarbonate, polyacrylate, polymethylmetacrylate, polyvinylcarbazole, polyimide, liquid crystalline polymer and mixtures thereof.

4. A light emitting polymer for an EL display concerning:

a light emitting polymer of claim 2; and at least one polymer selected from the group consisting of polystyrene, polycarbonate, polyacrylate, polymethylmethacrylate, polyvinylcarbazole, polyimide, liquid crystalline polymer and mixtures thereof.

5. A light emitting polymer for an EL display which is a blend of a light emitting polymer of the formula (I):

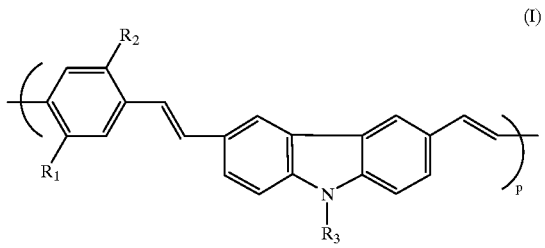

wherein $R_1$, $R_2$ and $R_3$ are the same or different, and represent a long chain aliphatic alkyl or branched aliphatic alkyl group, said long chain aliphatic alkyl group being represented as —$(CH_2)_n CH_3$, and said branched aliphatic alkyl group being represented as —$CH_2CHCH_3(CH_2)_n CH_3$, where n=1–12 and p is an integer of 5–100; and a light emitting polymer of the formula (II):

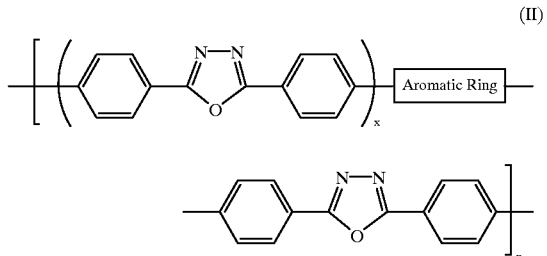

wherein x is 0 or 1, p is an integer of 5–100, and Aromatic Ring is represented by

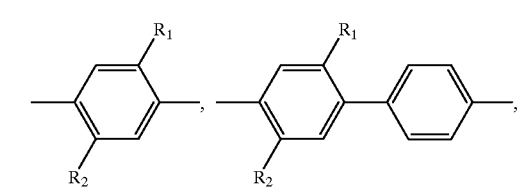

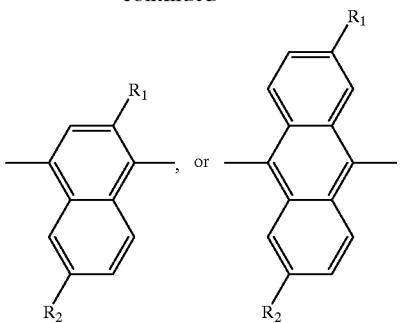

wherein $R_1$ is aliphatic alkyl or aliphatic alkyloxy, $R_2$ is branched alkyl or branched alkyloxy, said aliphatic alkyl represented as $(CH_2)_nCH_3$, where n=1–12, and aliphatic alkyloxy represented as $(OCH_2CH_2)_mCH_3$, where m=1–4, said branched alkyl represented as $CH_2CHCH_3(CH_2)_nCH_3$, where n is 1–12, and said branched alkyloxy represented as $OCH_2CHCH_3(CH_2)_nCH_3$, where n is 1–12.

6. The light emitting polymer for an EL display as defined in claim 3 which further comprises a lower molecular fluorescent dye.

7. The light emitting polymer for an EL display as defined in claim 4 which further comprises a lower molecular fluorescent dye.

8. The light emitting polymer for an EL display as defined in claim 5 which further comprises a lower molecular fluorescent dye.

9. The light emitting polymer for an EL display as defined in claim 6 wherein said lower molecular fluorescent dye is selected from the group consisting of Nile Red, tris(8-hydroxyquinoline) aluminum ($Alq_3$), 2-(4-tert-butylphenyl)-5-(4-biphenylyl)-1,3,4-(oxadiazole), N,N'-diphenyl-N,N'-di(m-tolyl)-benzidine, 4-(dicyanomethylene)-2-methyl-6-(4-dimethylaminostyryl)-4H-pyran, 3-(4-biphenylyl)-4-phenyl-5-(4-tert-butylphenyl)-1,2,4triazole, 4,4'-bis(9-carbazolyl)biphenyl and Coumarin 6.

10. The light emitting polymer for an EL display as defined in claim 7 wherein said lower molecular fluorescent dye is selected from the group consisting of Nile Red, tris(8-hydroxyquinoline) aluminum ($Alq_3$), 2-(40tert-butylphenyl)-5-(4-biphenylyl)-1,3,4-(oxadiazole), N,N'-diphenyl-N,N'-di(m-tolyl)-benzidine, 4-(dicyanomethylene)-2-methyl-6-(4-dimethylaminostyryl)-4H-pyran, 3-(4-biphenylyl)-4-phenyl-5-(4-tert-butylphenyl)-1,2,4-triazole, 4,4'-bis(9-carbazolyl)biphenyl and Coumarin 6.

11. The light emitting polymer for an EL display as defined in claim 8 wherein said lower molecular fluorescent dye is selected from the group consisting of Nile Red, tris(8-hydroxyquinoline) aluminum ($Alq_3$), 2-(4-tert-butylphenyl)-5-(4-biphenylyl)-1,3,4-(oxadiazole), N,N'-diphenyl-N,N'-di(m-tolyl)-benzidine, 4-(dicyanomethylene)-2-methyl-6(4dimethylaminostyryl)-4H-pyran, 3-(4-biphenylyl)-4-phenyl-5-(4-tert-butylphenyl)-1,2,4-triazole, 4,4'-bis(9-carbazolyl)biphenyl and Coumarin 6.

12. An organic electroluminescent polymer diode that includes a light emitting polymer according to any one of claims, 1, 2, 3, 4, 5, 6, 7, 8, 9, or 10 applied to a light emitting layer.

* * * * *

UNITED STATES PATENT AND TRADEMARK OFFICE
CERTIFICATE OF CORRECTION

PATENT NO. : 6,124,046
DATED : September 26, 2000
INVENTOR(S) : Sung-Ho Jim; Woo-Hong Kim; Byung-Hee Son; In-Sung Song and Eun-Mi Han It is certified that error appears in the above-identified patent and that said Letters Patent is hereby corrected as shown below:

Column 7, line 54, "l" should read -- L --.

Column 7, line 62, "ml" should read -- L --.

Column 7, line 66, "l" should read -- L --.

Column 8, line 8, "ml" should read -- L --.

Column 10, line 13, "6mm" should read -- $6mm^2$ --.

Signed and Sealed this

Fifteenth Day of May, 2001

Attest:

NICHOLAS P. GODICI

Attesting Officer     Acting Director of the United States Patent and Trademark Office